(12) United States Patent
Sudoh

(10) Patent No.: US 9,325,907 B2
(45) Date of Patent: Apr. 26, 2016

(54) ZOOM LENS AND CAMERA

(71) Applicant: Yoshifumi Sudoh, Saitama (JP)

(72) Inventor: Yoshifumi Sudoh, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/510,238

(22) Filed: Oct. 9, 2014

(65) Prior Publication Data

US 2015/0130961 A1 May 14, 2015

(30) Foreign Application Priority Data

Nov. 5, 2013 (JP) .................................. 2013-229033

(51) Int. Cl.
*G02B 15/14* (2006.01)
*G02B 9/34* (2006.01)
*H04N 5/232* (2006.01)
(Continued)

(52) U.S. Cl.
CPC ............ *H04N 5/23296* (2013.01); *G02B 15/17* (2013.01); *G02B 27/4211* (2013.01); *G02B 5/005* (2013.01); *G02B 5/1814* (2013.01); *G02B 9/34* (2013.01); *G02B 9/36* (2013.01); *G02B 13/002* (2013.01); *G02B 13/006* (2013.01); *G02B 13/009* (2013.01); *G02B 13/0015* (2013.01); *G02B 13/0055* (2013.01); *G02B 13/18* (2013.01); *G02B 15/14* (2013.01); *G02B 15/24* (2013.01); *G02B 27/0037* (2013.01);
(Continued)

(58) Field of Classification Search
CPC .......... G02B 9/34; G02B 13/18; G02B 15/14; G02B 13/009; G02B 13/0015; G02B 16/167; G02B 5/005; G02B 13/006; G02B 13/002; G02B 13/0055; G02B 15/24; G02B 27/0037; G02B 27/0056; G02B 27/0062; G02B 27/0944; G02B 27/42; G02B 27/4205; G02B 5/1814; G02B 9/36

USPC ......... 359/558, 574, 683, 688, 707, 715, 740, 359/775
See application file for complete search history.

(56) References Cited

U.S. PATENT DOCUMENTS 6,028,715 A * 2/2000 Takamoto .............. G02B 15/17
359/683
6,825,990 B2 * 11/2004 Yoshimi ............... G02B 15/161
359/691

(Continued)

FOREIGN PATENT DOCUMENTS

JP   2000-221402    8/2000
JP   2003-287678    10/2003

(Continued)

OTHER PUBLICATIONS

Now U.S. Pat. No. 9,195,036 (Sudoh) issued on Nov. 24, 2015.

*Primary Examiner* — Evelyn A Lester
(74) *Attorney, Agent, or Firm* — Oblon, McClelland, Maier & Neustadt, L.L.P.

(57) ABSTRACT

A zoom lens includes, in order from an object side, a first lens group having a positive refractive power, a second lens group having a negative refractive power, a third lens group having a negative refractive power, and a fourth lens group having a positive refractive power. During change of magnification from a short focal end to a long focal end, the first lens group is fixed, the second lens group is moved to an image side, the third lens group is moved, and the fourth lens group is fixed. The first lens group and the fourth lens group include diffraction surfaces and satisfy the Condition Expressions $50<f1doe/f1<200$ (1) and $100<f4doe/f4<300$ (2).

13 Claims, 18 Drawing Sheets

(51) Int. Cl.
  *G02B 15/17* (2006.01)
  *G02B 27/42* (2006.01)
  *G02B 13/18* (2006.01)
  *G02B 13/00* (2006.01)
  *G02B 5/00* (2006.01)
  *G02B 27/00* (2006.01)
  *G02B 9/36* (2006.01)
  *G02B 15/24* (2006.01)
  *G02B 27/09* (2006.01)
  *G02B 5/18* (2006.01)

(52) U.S. Cl.
  CPC ......... *G02B 27/0056* (2013.01); *G02B 27/0062* (2013.01); *G02B 27/0944* (2013.01)

(56) References Cited

U.S. PATENT DOCUMENTS

| | | | | |
|---|---|---|---|---|
| 7,672,063 | B2* | 3/2010 | Take | G02B 15/173 359/683 |
| 7,885,014 | B2* | 2/2011 | Inomoto | G02B 15/173 359/683 |
| 8,149,516 | B2* | 4/2012 | Yoshimi | G02B 15/173 359/683 |
| 8,477,429 | B2* | 7/2013 | Hori | G02B 15/173 359/686 |
| 2005/0219709 | A1* | 10/2005 | Wakazono | G02B 27/646 359/686 |
| 2007/0109665 | A1* | 5/2007 | Wakazono | G02B 15/17 359/687 |
| 2009/0135500 | A1 | 5/2009 | Sudoh et al. | |
| 2010/0027136 | A1 | 2/2010 | Ohashi et al. | |
| 2010/0296180 | A1 | 11/2010 | Sudoh et al. | |
| 2011/0122506 | A1* | 5/2011 | Ito | G02B 15/173 359/683 |
| 2012/0099202 | A1* | 4/2012 | Hatakeyama | G02B 15/177 359/557 |
| 2012/0127586 | A1 | 5/2012 | Sudoh | |
| 2013/0003189 | A1* | 1/2013 | Sanjo | G02B 7/008 359/686 |
| 2014/0029111 | A1* | 1/2014 | Shibata | G02B 15/20 359/686 |

FOREIGN PATENT DOCUMENTS

| | | |
|---|---|---|
| JP | 2008-197534 | 8/2008 |
| JP | 2009-098419 | 5/2009 |

* cited by examiner

ZOOM LENS AND CAMERA

CROSS-REFERENCE TO RELATED APPLICATIONS

This patent application is based on and claims priority pursuant to 35 U.S.C. §119(a) to Japanese Patent Application No. 2013-229033, filed on Nov. 5, 2013, in the Japan Patent Office, the entire disclosure of which is hereby incorporated by reference herein.

BACKGROUND

1. Technical Field

The present invention relates to a zoom lens, and more particularly to, a zoom lens having a diffraction surface, and a device having the zoom lens as a photographing optical system such as a camera.

2. Description of the Related Art

Market of cameras used for security and the like is widened, and demands are also increased in various fields. Among the demands, high image quality and high magnification changeability are constantly desired by users, and occupy large weights. Therefore, in the zoom lens used as a photographing lens, implementation of high performance with high magnification changeability is required.

Herein, in terms of high performance, a configuration having a resolving power corresponding to imaging elements of at least one million to five million pixels over the entire zoom range is needed. In addition, it is considered that a magnification changing ratio of about ×16 is needed as the high magnification changeability.

In addition, it is preferable that aberrations be sufficiently corrected even in a near-infrared wavelength region so that photographing is available even in a dark state.

In addition, widening of an angle of view is preferred, and preferably, a half angle of view at a short focal end of a zoom lens is about 25 degrees or more.

In addition, large-diameter of a lens is preferred, and preferably, an F number at a short focal end (sometimes, referred to as "wide angle") is 2.0 or less.

As an example, there is a zoom lens which is configured to include, in order from an object side toward an image side, a first lens group having a positive refractive power, a second lens group having a negative refractive power, a third lens group having a negative refractive power, and a fourth lens group having a positive refractive power and in which the first lens group has a diffraction surface.

However, there has been no zoom lens sufficiently satisfying user's demands for achieving a high angle of view and a small size with a high magnification changing ratio, an F number of 2.0 or less at the short focal end, and, particularly, small aberration in a near-infrared region.

SUMMARY

According to an embodiment of the present invention, there is provided a zoom lens including, in order from an object side, a first lens group having a positive refractive power, a second lens group having a negative refractive power, a third lens group having a negative refractive power, and a fourth lens group having a positive refractive power. During change of magnification from a short focal end to a long focal end, the first lens group is fixed, the second lens group is moved to an image side, the third lens group is moved, and the fourth lens group is fixed. The first lens group and the fourth lens group include diffraction surfaces and satisfy the following Condition Expressions (1) and (2), $$50 < f1doe/f1 < 200 \tag{1}$$

$$100 < f4doe/f4 < 300 \tag{2}$$

where f1doe denotes a focal length of the diffraction surface of the first lens group, f1 denotes a focal length of the first lens group, f4doe denotes a focal length of the diffraction surface of the fourth lens group, and f4 denotes a focal length of the fourth lens group.

According to another embodiment of the present invention, there is provided a camera including the zoom lens as a photographing optical system.

According to still another embodiment of the present invention, there is provided a camera including the zoom lens as a moving picture photographing optical system.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings.

FIG. 1A is a cross-sectional view at a short focal end (wide angle end) along an optical axis, FIG. 1B is a cross-sectional view at an intermediate focal length along the optical axis, and FIG. 1C is a cross-sectional view at a long focal end (telephoto end) along the optical axis;

FIG. 5A is a cross-sectional view at a short focal end along an optical axis, FIG. 5B is a cross-sectional view at an intermediate focal length along the optical axis, and FIG. 5C is a cross-sectional view at a long focal end along the optical axis;

FIG. 9A is a cross-sectional view at a short focal end along an optical axis, FIG. 9B is a cross-sectional view at an intermediate focal length along the optical axis, and FIG. 9C is a cross-sectional view at a long focal end along the optical axis;

FIG. 13A is a cross-sectional view at a short focal end along an optical axis, FIG. 13B is a cross-sectional view at an intermediate focal length along the optical axis, and FIG. 13C is a cross-sectional view at a long focal end along the optical axis;

Figure 1A:
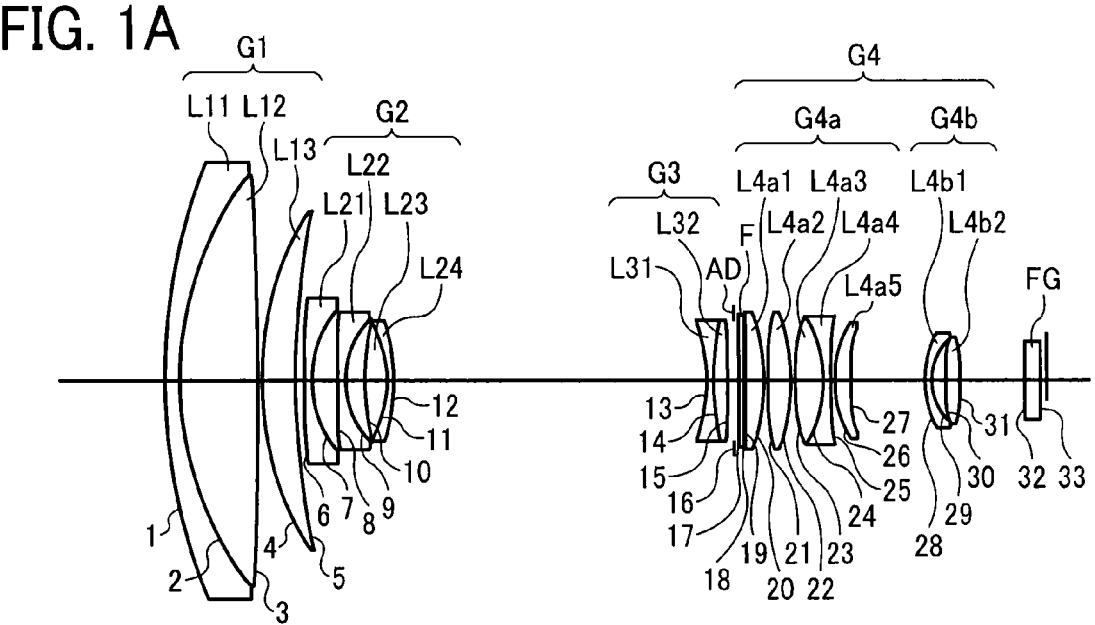
FIGS. 1A-1C are views illustrating a configuration of an optical system and a zoom locus accompanied with zooming of a zoom lens according to Example (numerical example; hereinafter the same) 1 of a first embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Hereinafter, zoom lenses and cameras according to embodiments of the present invention will be described in detail with reference to the drawings.

Before description of specific examples, firstly, an elementary embodiment of the present invention will be described.

According to an embodiment of the present invention, a first lens group having a positive refractive power, a second lens group having a negative refractive power, a third lens group having a negative refractive power, and a fourth lens group having a positive refractive power are arranged in order from an object side. In other words, a zoom lens configured with four lens groups of positive-negative-negative-positive lens groups is configured as a so-called variator where the second lens group performs a main magnification changing function.

During change of magnification from the short focal end to the long focal end, the first lens group is fixed, the second lens group is moved to the image side, the third lens group is moved, and the fourth lens group is fixed, so that the interval between the first lens group and the second lens group becomes large and the interval between the second lens group and the third lens group becomes small.

In addition, in order to correct chromatic aberration in a near-infrared wavelength region, it is preferable that a diffraction surface be used.

If the diffraction surface is used for the first lens group, correction of axial chromatic aberration at the long focal end is very effectively performed. In many cases of correcting the axial chromatic aberration at the long focal end by using a lens, an optical material having an abnormal dispersion property is used for the first lens group. Therefore, the number of lens constituents of the first lens group is increased, and as a result, the size of the lens becomes large. In addition, the optical material having an abnormal dispersion property has a large change in refractive index according to temperature and a large linear expansion coefficient, and if the number of optical materials used is large, there is another problem in that large influence of the change in temperature on the performance at the long focal end occurs.

In addition, if the diffraction surface is used for the fourth lens group, correction of axial chromatic aberration at the short focal end is very effectively performed. In many cases of correcting the axial chromatic aberration at the short focal end by using a lens, an optical material having an abnormal dispersion property is used for the fourth lens group. The optical material having an abnormal dispersion property has a large change in refractive index according to temperature and a large linear expansion coefficient, and if the number of optical materials used is large, large influence of the change in temperature on the performance at the short focal end occurs. In case of the zoom lens like the one in the embodiment of the present invention, focusing is considered to be performed by using the first lens group. However, if defocus change occurring due to the change in temperature at the short focal end is corrected by allowing the first lens group to move, the amount of movement of the first lens group is too large. Accordingly, in order to secure the interval, the zoom lens needs to have a large size, which is not preferable.

Therefore, it is preferable that the following Condition Expressions (1) and (2) be satisfied.

$$50 < f1doe/f1 < 200 \tag{1}$$

$$100 < f4doe/f4 < 300 \tag{2}$$

Herein, f1doe denotes a focal length of the diffraction surface of the first lens group, f1 denotes a focal length of the first lens group, f4doe denotes a focal length of the diffraction surface of the fourth lens group, and f4 denotes a focal length of the fourth lens group.

The focal length f of the diffraction surface is expressed by:

$$f = -1/(2 \times C2).$$

Herein, C2 denotes a second-order coefficient of phase function.

If a value is larger than an upper limit of Condition Expression (1), the effect of the correction of the axial chromatic aberration at the long focal end according to the diffraction surface becomes too small, so that it may be difficult to sufficiently correct the chromatic aberration. If a value is smaller than a lower limit of Condition Expression (1), disadvantage occurs in that the axial chromatic aberration at the long focal end according to the diffraction surface is excessively corrected, the diffraction pitch becomes too small and, thus, processing becomes difficult, or a flare occurs.

In addition, if a value is larger than an upper limit of Condition Expression (2), the effect of the correction of the axial chromatic aberration at the short focal end according to the diffraction surface becomes too small, so that it may be difficult to sufficiently correct the chromatic aberration. In addition, if a value is smaller than a lower limit of Condition Expression (2), disadvantage occurs in that the axial chromatic aberration at the short focal end according to the diffraction surface is excessively corrected, the diffraction pitch becomes too small and, thus, processing becomes difficult, or a flare occurs.

More preferably, the range may be reduced, and the following Condition Expressions (1a) and (2a) may be satisfied.

$$50 < f1doe/ft < 100 \tag{1a}$$

$$10 < f4doe/ft < 50 \tag{2a}$$

In order to sufficiently correct the chromatic aberration, the fourth lens group may be configured so that a 4a-th lens group is arranged at the object side from the position having the largest interval in the fourth lens group, a 4b-th lens group is arranged at the image side from the position having the largest interval in the fourth lens group. The 4a-th lens group may have the diffraction surface.

Since the axial ray of light passes through a high position in the 4a-th lens group in comparison with the 4b-th lens group, in order to correct the axial chromatic aberration, if the 4a-th lens group is allowed to use the diffraction surface, a higher effect may be obtained.

In order to sufficiently correct the axial chromatic aberration at the short focal end while suppressing the influence of change in temperature, among the positive lenses included in the 4a-th lens group, only one positive lens may satisfy the following Condition Expressions (3), (4), and (5).

$$1.40 < n_d < 1.65 \tag{3}$$

$$65.0 < v_d < 100.0 \tag{4}$$

$$0.015 < P_{g,F} - (-0.001802 \times v_d + 0.6483) < 0.060 \tag{5}$$

Herein, $n_d$ denotes a refractive index of the positive lens, $v_d$ denotes an Abbe number of the positive lens, and $P_{g,F}$ denotes a partial dispersion ratio of the positive lens.

Herein, when $n_g$, $n_F$, and $n_c$ denote refractive indexes of the positive lens with respect to a g line, an F line and a C line, the partial dispersion ratio $P_{g,F}$ is expressed by $P_{g,F} = (n_g - n_F)/(n_F - n_c)$.

In order to correct the axial chromatic aberration, it is desirable to use lenses satisfying Condition Expressions (3), (4), and (5) for the 4a-th lens group. However, an optical material satisfying Condition Expressions (3), (4), and (5) has a large change in refractive index according to temperature and a large linear expansion coefficient, and if the number of optical materials used is large, influence of the temperature on the performance occurs. Therefore, in order to implement the axial chromatic aberration with the influence of the temperature on the performance, it is preferable that the one positive lens satisfying the aforementioned Condition Expressions (3), (4), and (5) be used for the 4a-th lens group.

In order to sufficiently correct the axial chromatic aberration at the short focal end while suppressing the influence due to the change in temperature, the positive lens satisfying the aforementioned Condition Expressions (3), (4), and (5) may further satisfy the following Condition Expression.

$$0.2 < f4p/ft < 0.6 \tag{6}$$

Herein, f4p denotes a focal length of the positive lens satisfying Condition Expressions (3), (4), and (5) above, and ft denotes a focal length at the long focal end.

If a value is larger than an upper limit of Condition Expression (6), it is difficult to sufficiently obtain the effect of abnormal dispersion property, and it may be difficult to sufficiently correct axial chromatic aberration at the short focal end. In addition, if a value is smaller than a lower limit of Condition Expression (6), although the axial chromatic aberration at the short focal end may be sufficiently corrected, the influence of the temperature on the performance may become large, or it may be difficult to correct monochromatic aberration in the fourth lens group.

In order to sufficiently correct the axial chromatic aberration at the long focal end while suppressing the influence of change in temperature, among the positive lenses included in the first lens group, only one positive lens may satisfy the following Condition Expressions (3), (4), and (5).

$$1.40 < n_d < 1.65 \tag{3}$$

$$65.0 < v_d < 100.0 \tag{4}$$

$$0.015 < P_{g,F} - (-0.001802 \times v_d + 0.6483) < 0.060 \tag{5}$$

Herein, $n_d$ denotes a refractive index of the positive lens, $v_d$ denotes an Abbe number of the positive lens, and $P_{g,F}$ denotes a partial dispersion ratio of the positive lens.

Herein, when $n_g$, $n_F$, and $n_c$ denote refractive indexes of the positive lens with respect to a g line, an F line and a C line, $P_{g,F}$ is expressed by $P_{g,F} = (n_g - n_F)/(n_F - n_c)$.

In order to sufficiently correct the axial chromatic aberration at the long focal end while suppressing the influence of change in temperature, the positive lens satisfying Condition Expressions (3), (4), and (5) may further satisfy the following Condition Expression.

$$1.0 < f1p/ft < 2.0 \tag{7}$$

Herein, f1p denotes a focal length of the positive lens satisfying Condition Expressions (3), (4), and (5) above, and ft denotes a focal length at the long focal end.

If a value is larger than an upper limit of the aforementioned Condition Expression (7), it is difficult to sufficiently obtain the effect of abnormal dispersion property, and it may be difficult to sufficiently correct axial chromatic aberration at the long focal end. In addition, if a value is smaller than a lower limit of Condition Expression (7), although the axial chromatic aberration at the long focal end may be sufficiently corrected, the influence of the temperature on the performance may become large, or it may be difficult to correct monochromatic aberration in the first lens group.

In order to achieve higher performance, the following Condition Expression (8) may be satisfied.

$$0.5 < f1/ft < 0.9 \quad (8)$$

Herein, f1 denotes a focal length of the first lens group, and ft denotes a focal length at the long focal end.

If a value is larger than an upper limit of the aforementioned Condition Expression (8), the focal length of the first lens group becomes too large, and the interval for changing magnification becomes large, so that the thickness excluding the first lens group becomes small. Therefore, it may be difficult to correct the aberration in the groups excluding the first lens group. On the other hand, if a value is smaller than a lower limit of Condition Expression (8), the focal length of the first lens group becomes too small, so that it may be difficult to correct the aberration in the first lens group.

In order to achieve higher performance over the entire zoom range, it is preferable that the following Condition Expression (9) be satisfied.

$$0.10 < f4/ft < 0.3 \quad (9)$$

Herein, f4 denotes a focal length of the fourth lens group, and ft denotes a focal length at the long focal end. If Condition Expression (9) is satisfied, the fourth lens group takes balance over the entire zoom range, so that it is possible to achieve correction of aberration over the entire zoom range.

When the light amount arriving on an image forming surface needs to be reduced, although a diaphragm may become small, it is preferable that the light amount be reduced by using an ND filter or the like without greatly changing the diameter of the diaphragm in terms that the deterioration of the resolving power according to the diffraction phenomenon may be prevented.

It is preferable that focusing be performed by using the first lens group. In the case where focusing is performed by using the first lens group, there is a merit in that the position of the first lens group as a focusing group is the same even in any zoom range. Particularly, in the case of photographing a moving picture, there is a merit in that focusing does not need to be performed again at the time of zooming.

It is preferable that a laminated-type diffraction optical element be used for the diffraction surface. If the optical elements having appropriate refractive index difference with respect to each wavelength are laminated, it is possible to increase diffraction efficiency over the wide wavelength range.

In addition, the laminated optical element may be in close contact with the lens surface. Furthermore, if the cemented surface of the lens is configured as a diffraction structure, it is possible to implement a robust configuration which may withstand influence (disturbance) of the environment on the diffraction surface.

On the other hand, if the above-described zoom lens according to the embodiment of the present invention is used as a photographing optical system, it is possible to configure a camera such as a so-called digital camera or a moving picture photographing camera (so-called movie camera).

The camera includes the above-described zoom lens as a photographing optical system, so that it is possible to implement a small-sized, high-image-quality camera having a magnification changing range capable of sufficiently covering a typical photographing range.

As described above, in one embodiment, a zoom lens may be provided, which achieves a high angle of view and a small size with a high magnification changing ratio, and having small aberration in a near-infrared wavelength region.

In addition, according to the embodiment, a zoom lens may be provided, having a magnification changing ratio of about ×16, a half angle of view of about 30 degrees at the short focal end, an F number of 2.0 or less at the short focal end, an F number of about 2.0 at the long focal end, the number of lens constituents of about 15 or 16, a relatively low cost, sufficient correction of aberration in a near-infrared wavelength region, a small size, and a resolving power corresponding to imaging elements of one million to five million pixels.

According to the embodiment of the present invention, a zoom lens may be provided, having better correction of chromatic aberration and high performance.

According to the embodiment of the present invention, a zoom lens may be provided, having better correction of chromatic aberration and high performance while suppressing influence of the change in temperature on the performance.

According to the embodiment of the present invention, a zoom lens may be provided, having much better correction of aberrations and high performance.

According to the embodiment of the present invention, a small-sized, high-image-quality camera may be provided, using, as a photographing optical system, a zoom lens having a magnification changing ratio of about ×16, a half angle of view of about 30 degrees at the short focal end, an F number of 2.0 or less at the short focal end, an F number of about 2.0 at the long focal end, the number of lens constituents of about 15 or 16, a relatively low cost, sufficient correction of aberration in a near-infrared wavelength region, a small size, and a resolving power corresponding to imaging elements of one million to five million pixels, so that it is possible for a user to photograph a high quality image with a camera having an excellent portability.

According to the embodiment of the present invention, a small-sized, high-image-quality camera may be provided, capable of imaging a moving picture using, as a photographing optical system of a camera function unit, a zoom lens having a magnification changing ratio of about ×16, a half angle of view of about 30 degrees at the short focal end, an F number of 2.0 or less at the short focal end, an F number of about 2.0 at the long focal end, the number of lens constituents of about 15 or 16, a relatively low cost, sufficient correction of aberration in a near-infrared wavelength region, a small size, and a resolving power corresponding to imaging elements of one million to five million pixels, so that it is possible for a user to photograph a high quality image with a camera having an excellent portability.

Next, specific examples based on the above-described principle embodiment of the present invention will be described in detail. Examples 1 to 4 described hereinafter are examples having specific configurations corresponding to numerical examples (Numerical Examples) of the zoom lenses according to the first to fourth embodiments of the present invention. FIGS. 1A-1C to 4 are diagrams for explaining the zoom lens according to Example 1 of the first embodiment of the present invention. FIGS. 5A-5C to 8 are diagrams for explaining the zoom lens according to Example 2 of the second embodiment of the present invention. FIGS. 9A-9C to 12 are diagrams for explaining the zoom lens according to Example 3 of the third embodiment of the present invention.

In addition, FIGS. 13A-13C to 16 are diagrams for explaining the zoom lens according to Example 4 of the fourth embodiment of the present invention.

All the zoom lenses according to Examples 1 to 4 are so-called positive-negative-negative-positive four-lens-unit zoom lenses, where the first lens group having a positive refractive power, the second lens group having a negative refractive power, the third lens group having a negative refractive power, and the fourth lens group having a positive refractive power are arranged in order from the object side.

In the zoom lens of each example of Examples 1 to 4, an optical element configured with a parallel plate arranged at the image surface side of the fourth lens group is assumed to be various optical filters such as an optical low pass filter and a UV cutoff filter, a cover glass (sealing glass) for a light reception imaging device such as a complementary metal oxide semiconductor (CMOS) image sensor or a charge coupled device (CCD) image sensor, or the like. Herein, the element is collectively referred to as a filter or the like FG as an equivalent transparent parallel plate.

In addition, a parallel plate arranged at the object side or the image side of a diaphragm AD is assumed to be various filters F such as an ND filter.

In addition, glass materials of the optical glass used in each example of Examples 1 to 4 are indicated by optical glass type names of products of OHARA INC. and HOYA CORPORATION.

In all the examples, although all the materials of lenses are described to be optical glass, a resin lens may be used.

In the zoom lens of each example of Examples 1 to 4, the aberrations are sufficiently corrected, so that the examples may be adapted to a light receiving element of one million to five million pixels or more. It will be obvious from Examples 1 to 4 that, if the zoom lens is configured according to the first to fourth embodiments of the present invention, it is possible to achieve a sufficiently small size and to secure significantly excellent imaging performance.

Meanings of symbols common to Examples 1 to 4 are as follows.
    f: focal length of the entire system of an optical system
    F: F value (F number)
    $\omega$: half angle of view (degrees)
    R: radius of curvature
    D: spacing
    $n_d$: refractive index
    $v_d$: Abbe number
    C2: second-order coefficient of phase function
    C4: fourth-order coefficient of phase function When a reference wavelength (d-line) is denoted by $\lambda d$, a distance from an optical axis is denoted by h, and a phase is denoted by $\phi(h)$, the shape of the diffraction grating is expressed by:

$$\phi(h)=(2\pi/\lambda d)(C2 \cdot h^2 + C4 \cdot h^4).$$

Example 1

Figure 1B:
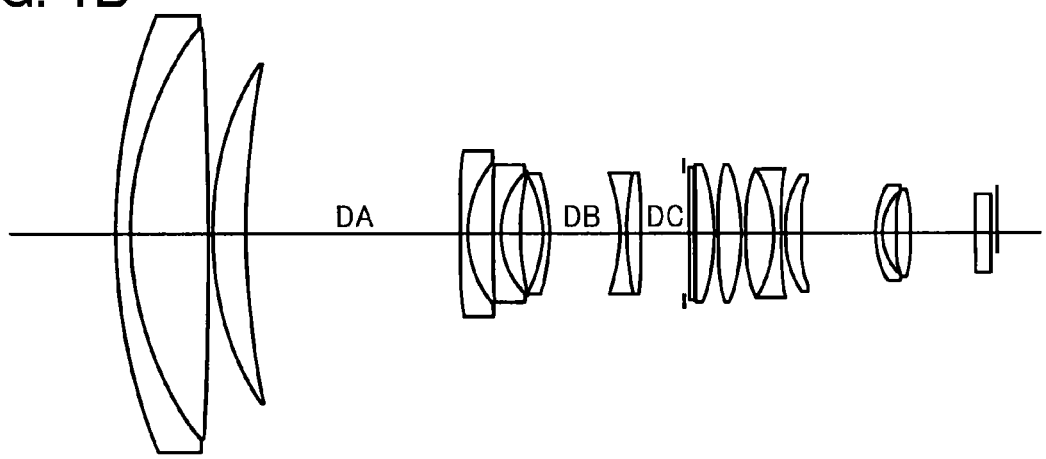
Figure 1C:
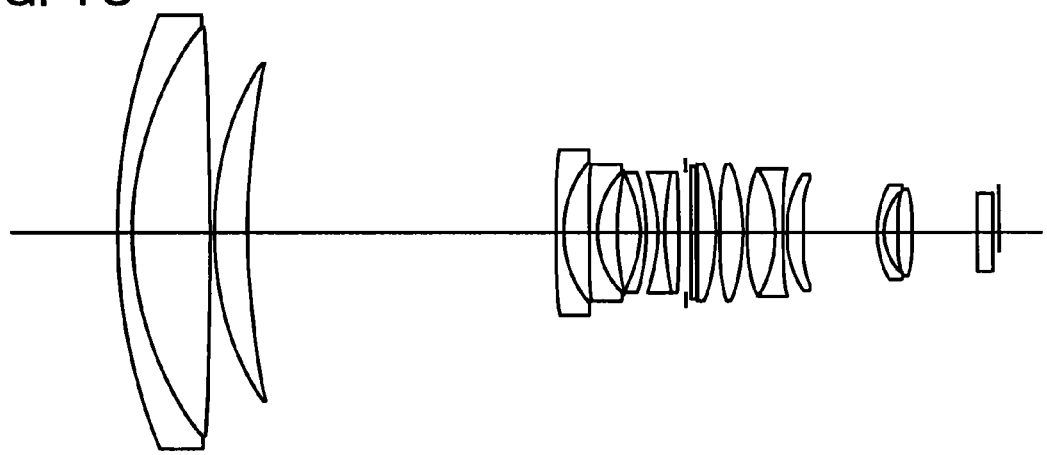

FIGS. 1A-1C illustrate a lens configuration of an optical system and a zoom locus accompanied with zooming from a short focal end, that is, a wide angle end, through a predetermined intermediate focal length to a long focal end, that is, a telephoto end of the zoom lens according to Example 1 of the first embodiment of the present invention. FIG. 1A is a cross-sectional view illustrating the short focal end, that is, the wide angle end. FIG. 1B is a cross-sectional view illustrating the predetermined intermediate focal length. FIG. 1C is a cross-sectional view illustrating the long focal end, that is, the telephoto end. In addition, in FIGS. 1A-1C illustrating the arrangement of the lens group of Example 1, the left side of the illustration is the object side (subject side).

The zoom lens illustrated in FIGS. 1A-1B include, in order from the object side, a first lens group G1 having a positive refractive power, a second lens group G2 having a negative refractive power, a third lens group G3 having a negative refractive power, and a fourth lens group G4 having a positive refractive power.

The fourth lens group G4 includes a 4a-th lens group G4a which is arranged at the object side from the position having the largest interval in the fourth lens group G4 and a 4b-th lens group G4b which is arranged at the image side.

The first to fourth lens groups G1 to G4 are supported by an appropriate common support frame or the like for each group; during the zooming or the like, each group of the second lens group G2 and the third lens group G3 is integrally operated; and an aperture diaphragm AD is installed integrally with the fourth lens group G4. In FIGS. 1A-1B, each optical surface is indicated by a surface number. In addition, each reference numeral in FIGS. 1A-1C is used independently of each example in order to avoid complication of the description due to an increase in digit number of reference numerals. Therefore, a component indicated by the same reference numeral in the figures associated with a different embodiment may not necessarily have the same configuration as that of the different embodiment.

During change of magnification from the short focal end (wide angle end) to the long focal end (telephoto end), the first lens group G1 is fixed, the second lens group G2 is moved to the image side, the third lens group G3 is moved, and the fourth lens group G4 is fixed. As a result, the lens groups are moved so that the interval between the first lens group G1 and the second lens group G2 becomes large and the interval between the second lens group G2 and the third lens group G3 becomes small.

In the first embodiment of the present invention illustrated in FIGS. 1A-1C, the first lens group G1 of the zoom lens according to Example (numerical example: hereinafter, the same) 1 includes, in order from the object side, a negative lens L11 which is configured with a negative meniscus lens directing the concave surface toward the image surface side, a positive lens L12 which is configured with a biconvex lens directing the convex surface having a curvature larger than that of the image surface side toward the object side, and a positive lens L13 which is configured with a positive meniscus lens directing the convex surface toward the object side.

A laminated-type diffraction optical element is configured to be in close contact with the lens surface of the first lens group G1, in the case of this example, a cemented surface 2 between the negative lens L11 and the positive lens L12.

In addition, the two lenses of the negative lens L11 and the positive lens L12 of the first lens group G1 are closely put together to be integrally bonded, so that a two-sheet cemented lens is formed.

The second lens group G2 includes, in order from the object side, a negative lens L21 which is configured with a negative meniscus lens directing the concave surface toward the image surface side, a negative lens L22 which is configured with a negative meniscus lens directing the concave surface toward the image surface side, a positive lens L23 which is configured with a biconvex lens directing the convex surface having a curvature larger than that of the surface of the object side toward the image surface side, and a negative lens L24 which is configured with a negative meniscus lens directing the concave surface toward the object side. In addition, the two lenses of the positive lens L23 and the negative lens L24 are closely put together to be integrally cemented, so that a two-sheet cemented lens is formed.

The third lens group G3 includes a negative lens L31 which is configured with a biconcave lens directing the concave surface having a curvature larger than that of the image surface side toward the object side and a positive lens L32 which is configured with a biconvex lens directing the convex surface having a curvature larger than that of the image surface side toward the object side.

In addition, the two lenses of the negative lens L31 and the positive lens L32 of the third lens group G3 are closely put together to be integrally cemented, so that a two-sheet cemented lens is formed.

The aperture diaphragm AD and various filters F such as an ND filter which is adjacent to the aperture diaphragm AD and is configured with a parallel plate are inserted between the third lens group G3 and the fourth lens group G4 to be retained integrally with the fourth lens group G4.

In the fourth lens group G4, the 4a-th lens group G4a which is arranged at the object side from the position having the largest interval in the fourth lens group G4 includes, in order from the object side, a positive lens L4a1 which is configured with a positive meniscus lens directing the convex surface toward the image surface side, a positive lens L4a2 which is configured with a biconvex lens directing the convex surface having a curvature larger than that of the surface of the object side toward the image surface side, a positive lens L4a3 which is configured with a biconvex lens directing the convex surface having a curvature larger than that of the surface of the object side toward the image surface side, a negative lens L4a4 which is configured with a biconcave lens directing the concave surface having a curvature larger than that of the surface of the image surface side toward the object side, and a positive lens L4a5 which is configured with a positive meniscus lens directing the convex surface toward the object side. A laminated-type diffraction optical element is configured to be in close contact with a cemented surface 24 between the positive lens L4a3 and the negative lens L4a4 of the fourth lens group G4.

In addition, the positive lens L4a3 and the negative lens L4a4 of the 4b-th lens group G4b are closely put together to be integrally cemented, so that a two-sheet cemented lens is formed.

In the fourth lens group G4, the 4b-th lens group G4b which is arranged at the image surface side from the position having the largest interval in the fourth lens group G4 includes, in order from the object side, a negative lens L4b1 which is configured with a negative meniscus lens directing the concave surface toward the image surface side and a positive lens L4b2 which is configured with a biconvex lens directing the convex surface having a curvature larger than that of the image surface side toward the object side.

In addition, various optical filters such as an optical low pass filter or an IR cutoff filter or a cover glass (sealing glass) for a light reception imaging device such as a CMOS image sensor or a CCD image sensor are assumed to be arranged at the image surface side of the 4b-th lens group G4b. Herein, a filter or the like FG illustrated as an equivalent transparent parallel plate is arranged.

In this case, as illustrated in FIGS. 1A-1C, during change of magnification from the short focal end to the long focal end, the first lens group G1 is fixed, the second lens group G2 is moved to the image side, the third lens group G3 is moved, and the fourth lens group G4 is fixed. As a result, the interval between the first lens group G1 and the second lens group G2 becomes large and the interval between the second lens group G2 and the third lens group G3 becomes small.

It is preferable that focusing be performed by using the first lens group G1.

This is because there is a merit in that, in the case where focusing is performed by using the first lens group, the position of the first lens group as a focusing group is the same even in any zoom range.

In Example 1, the focal length f of the entire optical system, the F number F, and the half angle of view ω are changed in the respective ranges of f=7.72 to 30.00 to 116.42, F=1.65 to 1.65 to 1.88, and ω=31.33 to 8.10 to 2.11 by the zooming from the short focal end to the long focal end. Optical characteristics of each optical element are as illustrated in the following Table 1.

TABLE 1

|   | R | D | N | ν | Glass |
|---|---|---|---|---|---|
| 1 | 99.967 | 2.50 | 1.80518 | 25.42 | S-TIH6(OHARA) |
| 2* | 57.167 | 13.27 | 1.65160 | 58.55 | S-LAL7(OHARA) |
| 3 | −596.964 | 0.50 | | | |
| 4 | 54.068 | 5.88 | 1.49700 | 81.54 | S-FPL51(OHARA) |
| 5 | 135.140 | DA | | | |
| 6 | 158.333 | 1.20 | 1.88300 | 40.76 | S-LAH58(OHARA) |
| 7 | 18.112 | 4.60 | | | |
| 8 | 1008.913 | 1.20 | 1.69680 | 55.53 | S-LAL14(OHARA) |
| 9 | 15.106 | 3.43 | 1.92286 | 18.90 | S-NPH2(OHARA) |
| 10 | 44.937 | 3.65 | | | |
| 11 | −20.234 | 1.20 | 1.90366 | 31.31 | TAFD25(HOYA) |
| 12 | −31.622 | DB | | | |
| 13 | −30.983 | 1.20 | 1.90366 | 31.31 | TAFD25(HOYA) |
| 14 | 40.150 | 2.48 | 1.92286 | 18.90 | S-NPH2(OHARA) |
| 15 | −172.725 | DC | | | |
| 16 | Aperture Diaphragm | 0.53 | | | |
| 17 | 0.000 | 0.80 | 1.51633 | 64.14 | S-BSL7(OHARA) |
| 18 | 0.000 | 0.50 | | | |
| 19 | −2085.498 | 3.15 | 1.71300 | 53.87 | S-LAL8(OHARA) |
| 20 | −32.646 | 0.50 | | | |
| 21 | 59.534 | 4.18 | 1.49700 | 81.54 | S-FPL51(OHARA) |
| 22 | −33.393 | 0.50 | | | |
| 23 | 33.477 | 4.85 | 1.51633 | 64.14 | S-BSL7(OHARA) |
| 24* | −22.997 | 1.20 | 1.90366 | 31.31 | TAFD25(HOYA) |
| 25 | 73.996 | 0.68 | | | |
| 26 | 17.099 | 2.86 | 1.65160 | 58.55 | S-LAL7(OHARA) |
| 27 | 36.445 | 12.57 | | | |
| 28 | 15.968 | 1.20 | 1.67790 | 55.34 | S-LAL12(OHARA) |
| 29 | 9.464 | 2.28 | | | |
| 30 | 28.953 | 2.51 | 1.61405 | 54.99 | S-BSM9(OHARA) |
| 31 | −36.398 | 11.10 | | | |
| 32 | 0.000 | 2.70 | 1.49782 | 67.00 | Filter or the like |
| 33 | 0.000 | | | | |

In Example 1, variable amounts such as the focal length f of the entire optical system, the F value, the half angle of view w, the variable interval DA between the first lens group G1 and the second lens group G2, the variable interval DB between the second lens group G2 and the third lens group G3, the variable interval DC between the third lens group G3 and the aperture diaphragm AD, and the like are changed according to zooming, that is, moving in the short focal end (Wide), the intermediate focal length (Mean), and the long focal end (Tele) as illustrated in the following Table 2.

TABLE 2

|   | Wide | Mean | Tele |
|---|---|---|---|
| f | 7.72 | 30.00 | 116.42 |
| F Number | 1.65 | 1.65 | 1.88 |
| ω | 31.33 | 8.10 | 2.11 |
| DA | 1.5004 | 36.4082 | 52.5023 |
| DB | 53.0724 | 11.8729 | 2.0638 |
| DC | 1.2001 | 7.4836 | 1.2000 |

When the second-order and fourth-order coefficients of the phase function are denoted by C2 and C4, respectively, the focal length fdoe of the diffraction surface is expressed by:

$$fdoe = -1/(2 \times C2).$$

In Example 1, C2 of the second-order coefficient of the phase function of the diffraction surface formed on each of the second surface and the 24-th surface, that is, the cemented surface between the negative lens L11 and the positive lens L12, and the cemented surface 24 between the positive lens L4a3 and the negative lens L4a4 is as illustrated by the following Table 3. In addition, C4 of the fourth-order coefficient of the phase function is also illustrated.

TABLE 3

| Coefficients of Phase Function | | | |
|---|---|---|---|
| | λ | C2 | C4 |
| 2 | 587.6 | −5.77839E−05 | 5.92300E−09 |
| 24 | 587.6 | −1.66359E−04 | 1.71264E−07 |

In addition, as described above, when a reference wavelength (d-line) is denoted by λd, a distance from an optical axis is denoted by h, and a phase is denoted by φ(h), the shape of the diffraction grating is expressed by:

$$\phi(h) = 2\pi/\lambda d(C2 \cdot h^2 + C4 \cdot h^4).$$

In the case of Example 1, the values corresponding to the aforementioned Condition Expressions (1) to (9) are illustrated in the following Table 4 and satisfy the respective Condition Expressions (1) to (9).

TABLE 4

| Condition Expression | |
|---|---|
| f1doe/f1 (1) | 103.38 |
| f4doe/f4 (2) | 137.87 |
| f1doe/ft (1a) | 74.33 |
| f4doe/ft (2a) | 25.82 |
| $n_d$ (3) | 1.49700 |
| $v_d$ (4) | 81.54 |
| $P_{g,F} - (-0.001802 \times v_d + 0.6483)$ (5) | 0.036 |
| f4p/ft (6) | 0.38 |
| $n_d$ (3) | 1.49700 |
| $v_d$ (4) | 81.54 |
| $P_{g,F} - (-0.001802 \times v_d + 0.6483)$ (5) | 0.036 |
| f1p/ft (7) | 1.52 |
| f1/ft (8) | 0.72 |
| f4/ft (9) | 0.19 |

Figure 2:
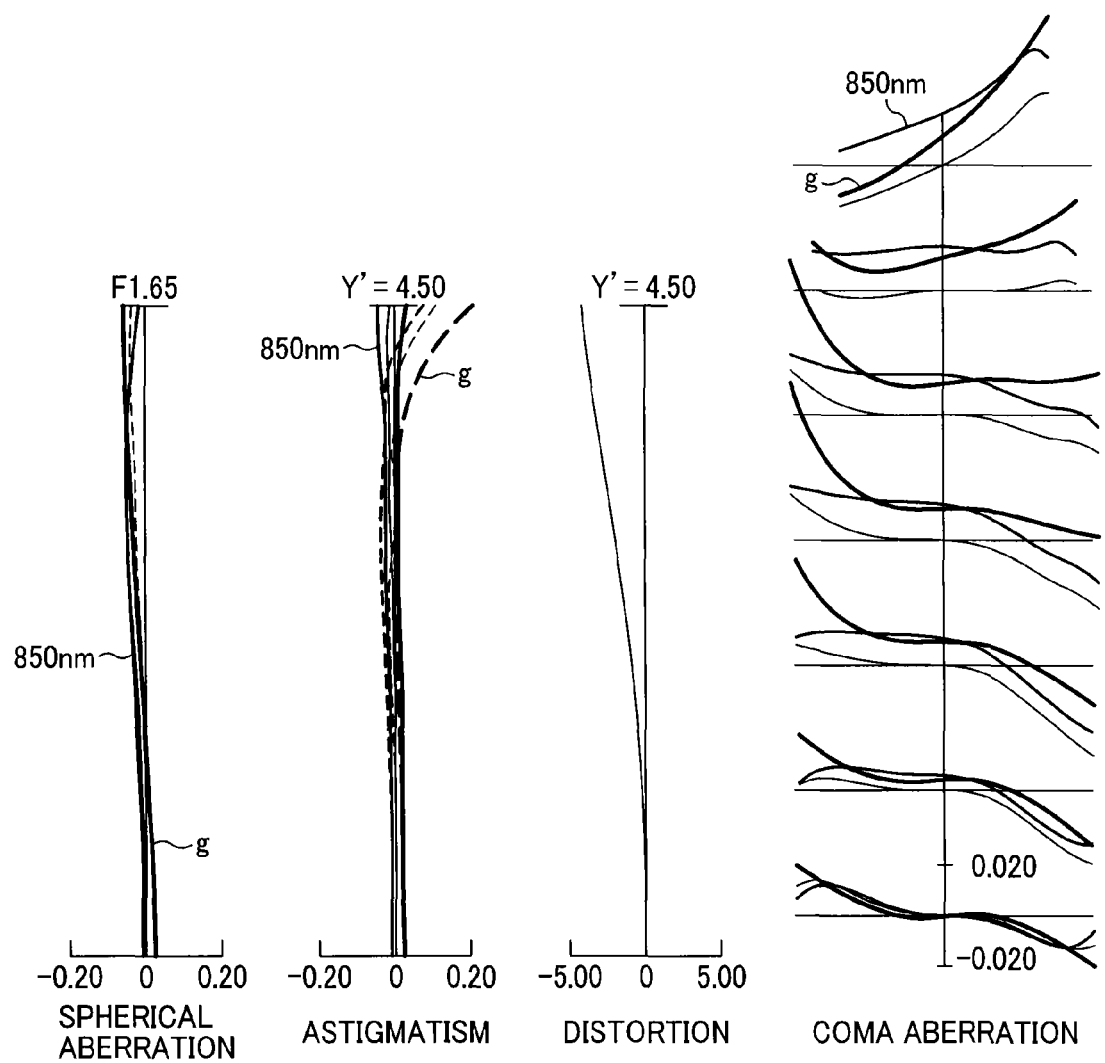
FIG. 2 is an aberration curve illustrating spherical aberration, astigmatism, distortion aberration, and coma aberration at the short focal end (wide angle end) of the zoom lens according to Example 1 of the present invention illustrated in FIGS. 1A-1C.
Figure 3:
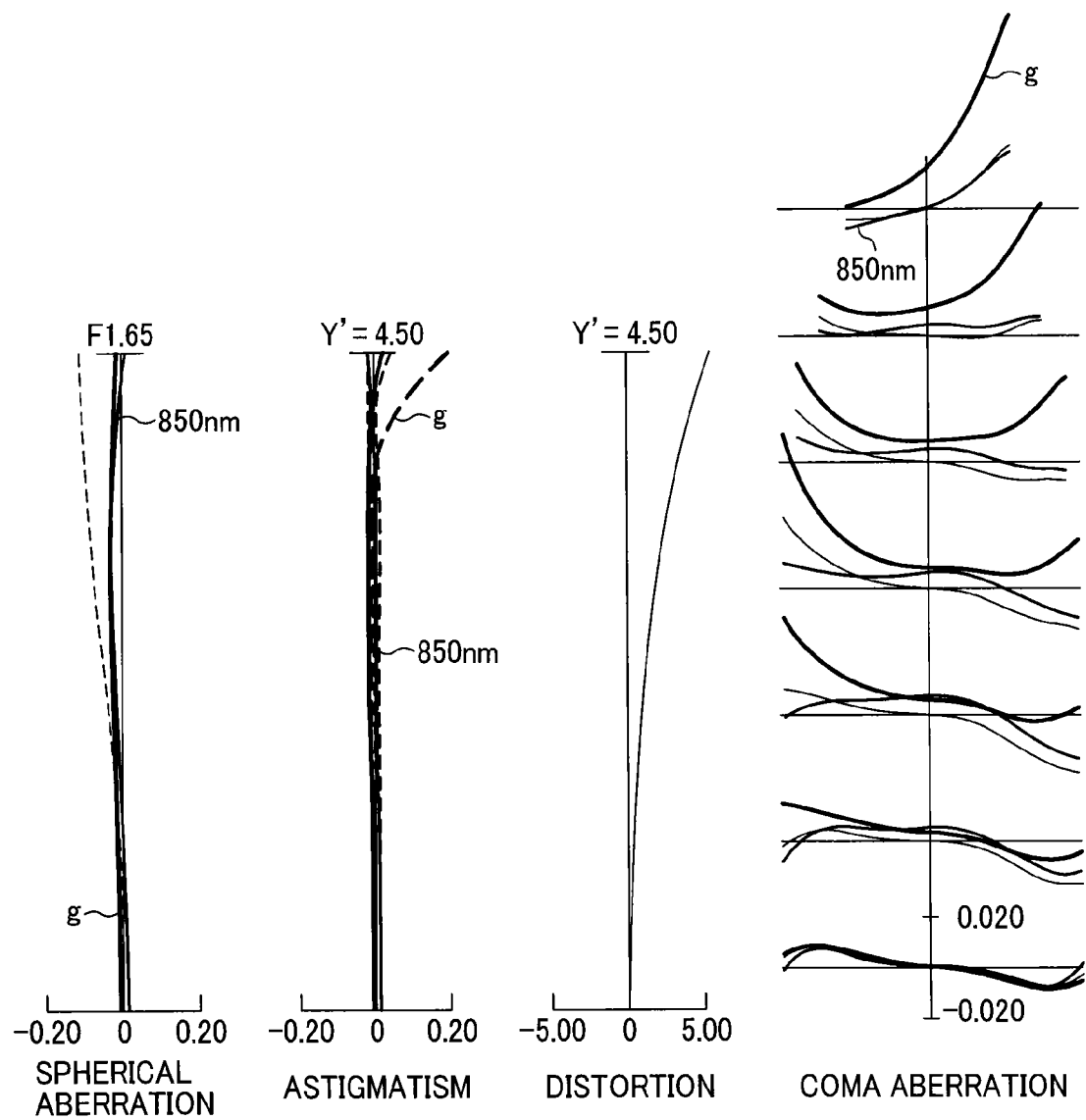
FIG. 3 is an aberration curve illustrating spherical aberration, astigmatism, distortion aberration, and coma aberration at the intermediate focal length of the zoom lens according to Example 1 of the present invention illustrated in FIGS. 1A-1C.
Figure 4:
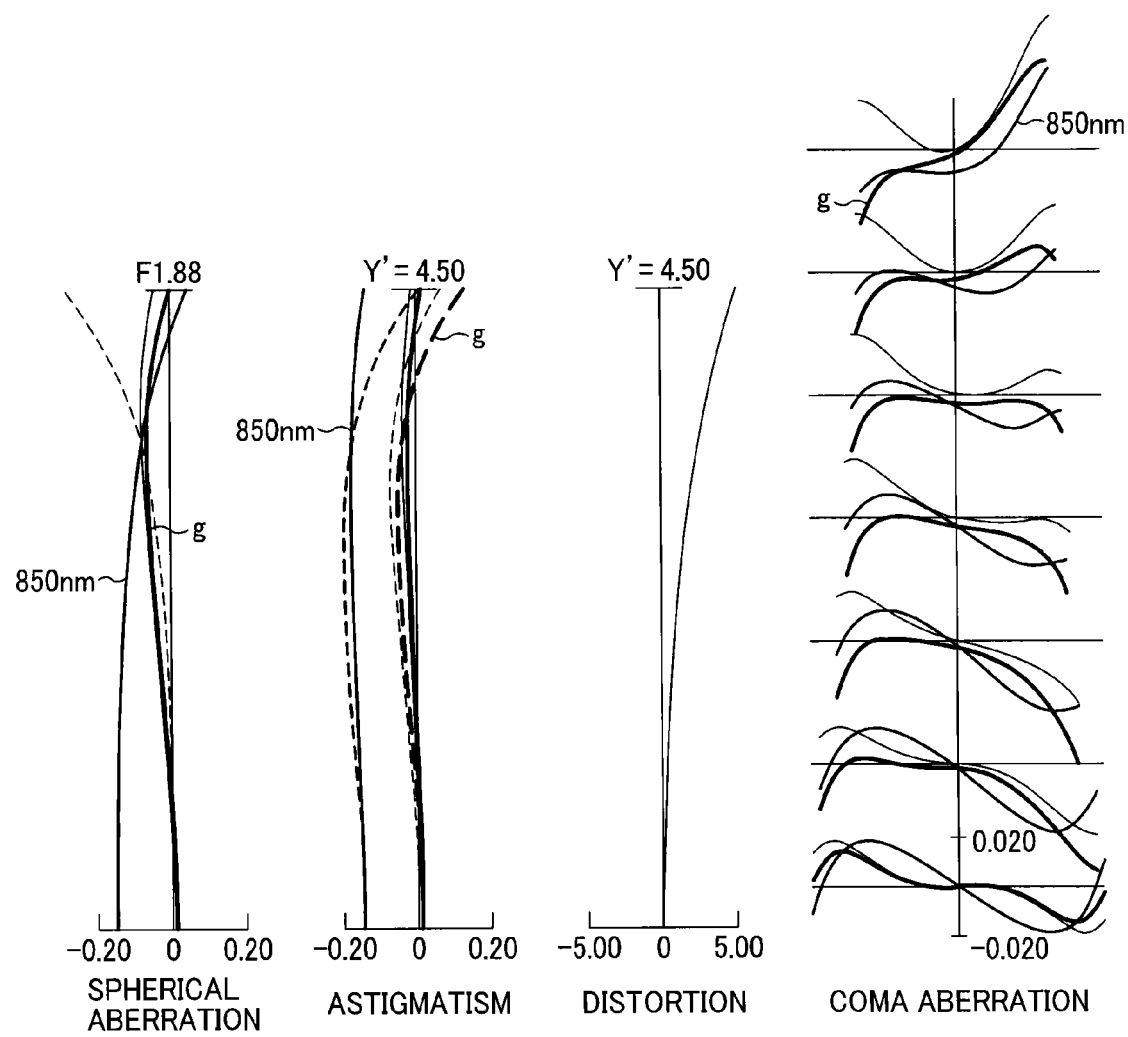
FIG. 4 is an aberration curve illustrating spherical aberration, astigmatism, distortion aberration, and coma aberration at the long focal end (telephoto end) of the zoom lens according to Example 1 of the present invention illustrated in FIGS. 1A-1C.

In addition, FIGS. 2, 3, and 4 illustrate aberration curves of spherical aberration, astigmatism, distortion aberration, and coma aberration at the short focal end (wide angle end), the intermediate focal length, and the long focal end (telephoto end) of Example 1, respectively. In addition, in the aberration curves, a broken line of the spherical aberration curve indicates a sinusoidal condition; and a solid line and a broken line of the astigmatism graph indicate sagittal and meridional, respectively. These are the same in aberration curves of other examples.

As obvious from FIGS. 2 to 4, in the zoom lens according to Example 1, the aberrations are sufficiently corrected. Since the example may be adapted to a light receiving element of one million to five million pixels, it is obvious that, if the zoom lens is configured according to Example 1, it is possible to achieve a sufficiently small size and to secure significantly excellent imaging performance.

Example 2

Figure 5A:
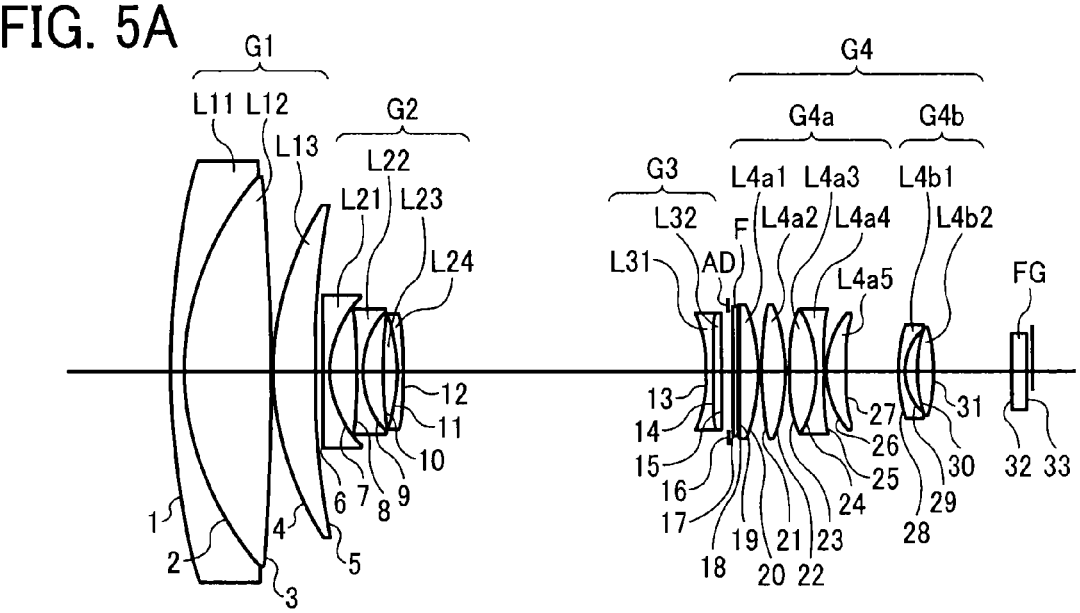
FIGS. 5A-5C are views illustrating a configuration of an optical system and a zoom locus accompanied with zooming of a zoom lens according to Example 2 of a second embodiment of the present invention.
Figure 5B:
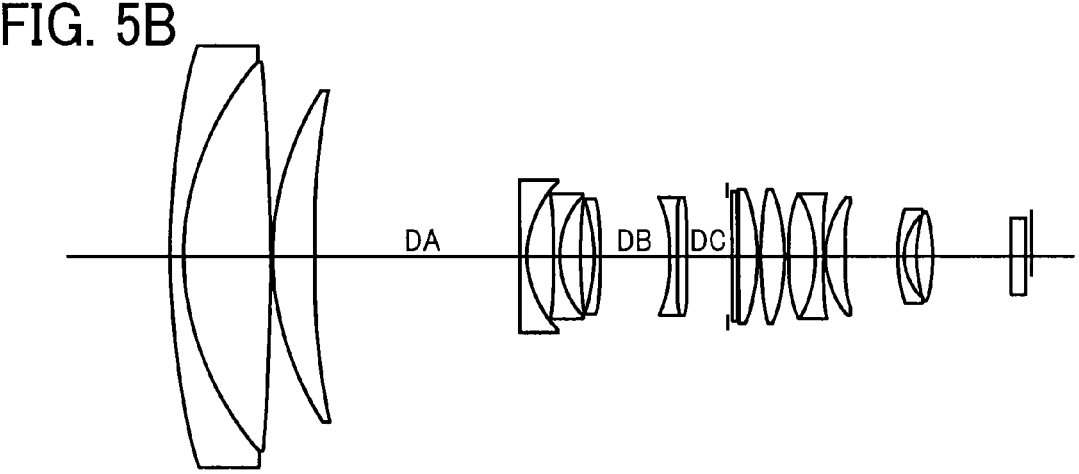
Figure 5C:
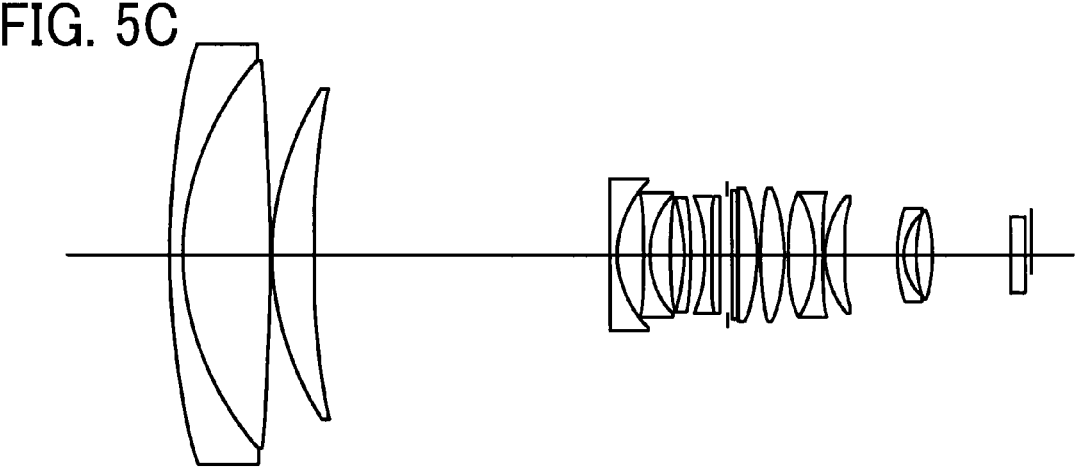

FIGS. 5A-5C illustrate a lens configuration of an optical system and a zoom locus accompanied with zooming from a short focal end, that is, a wide angle end, through a predetermined intermediate focal length to a long focal end, that is, a telephoto end of the zoom lens according to Example 2 of the second embodiment of the present invention. FIG. 5A is a cross-sectional view illustrating the short focal end, that is, the wide angle end. FIG. 5B is a cross-sectional view illustrating the predetermined intermediate focal length. FIG. 5C is a cross-sectional view illustrating the long focal end, that is, the telephoto end. In addition, in FIGS. 5A-5C illustrating the arrangement of the lens group of Example 2, the left side of the illustration is the object side (subject side).

The zoom lens illustrated in FIGS. 5A-5C include, in order from the object side, a first lens group G1 having a positive refractive power, a second lens group G2 having a negative refractive power, a third lens group G3 having a negative refractive power, and a fourth lens group G4 having a positive refractive power.

The fourth lens group G4 includes a 4a-th lens group G4a which is arranged at the object side from the position having the largest interval in the fourth lens group G4 and a 4b-th lens group G4b which is arranged at the image side.

The first to fourth lens groups G1 to G4 are supported by an appropriate common support frame or the like for each group; during the zooming or the like, each group of the second lens group G2 and the third lens group G3 is integrally operated; and an aperture diaphragm AD is installed integrally with the fourth lens group G4. In FIGS. 5A-5C, each optical surface is indicated by a surface number. In addition, each reference numeral in FIGS. 5A-5C is used independently of each example in order to avoid complication of the description due to an increase in digit number of reference numerals. Therefore, a component indicated by the same reference numeral in the figures associated with a different embodiment may not necessarily have the same configuration as that of the different embodiment.

During change of magnification from the short focal end (wide angle end) to the long focal end (telephoto end), the first lens group G1 is fixed, the second lens group G2 is moved to the image side, the third lens group G3 is moved, and the fourth lens group G4 is fixed. As a result, the lens groups are moved so that the interval between the first lens group G1 and the second lens group G2 becomes large and the interval between the second lens group G2 and the third lens group G3 becomes small.

In the second embodiment of the present invention illustrated in FIGS. 5A-5C, the first lens group G1 of the zoom lens according to Example (numerical example: hereinafter, the same) 2 includes, in order from the object side, a negative lens L11 which is configured with a negative meniscus lens directing the concave surface toward the image surface side, a positive lens L12 which is configured with a biconvex lens directing the convex surface having a curvature larger than that of the image surface side toward the object side, and a positive lens L13 which is configured with a positive meniscus lens directing the convex surface toward the object side.

A laminated-type diffraction optical element is configured to be in close contact with the lens surface of the first lens group G1, in the case of this example, a cemented surface 2 between the negative lens L11 and the positive lens L12.

In addition, the two lenses of the negative lens L11 and the positive lens L12 of the first lens group G1 are closely put together to be integrally bonded, so that a two-sheet cemented lens is formed.

The second lens group G2 includes, in order from the object side, a negative lens L21 which is configured with a biconcave lens directing the concave surface having a curvature larger than that of the surface of the object side toward the image surface side, a negative lens L22 which is configured with a biconcave lens directing the concave surface having a curvature larger than that of the surface of the object side toward the image surface side, a positive lens L23 which is configured with a biconvex lens directing the convex surface having a curvature larger than that of the surface of the object side toward the image surface side, and a negative lens L24 which is configured with a negative meniscus lens directing the concave surface toward the object side.

In addition, the two lenses of the positive lens L23 and the negative lens L24 are closely put together to be integrally bonded, so that a two-sheet cemented lens is formed.

The third lens group G3 includes a negative lens L31 which is configured with a biconcave lens directing the concave surface having a curvature larger than that of the image surface side toward the object side and a positive lens L32 which is configured with a biconvex lens directing the convex surface having a curvature larger than that of the image surface side toward the object side.

In addition, the two lenses of the negative lens L31 and the positive lens L32 of the third lens group G3 are closely put together to be integrally bonded, so that a two-sheet cemented lens is formed.

An aperture diaphragm AD and various filters F such as an ND filter which is adjacent to the aperture diaphragm AD and is configured with a parallel plate are inserted between the third lens group G3 and the fourth lens group G4 to be retained integrally with the fourth lens group G4.

In the fourth lens group G4, the 4a-th lens group G4a which is arranged at the object side from the position having the largest interval in the fourth lens group G4 includes, in order from the object side, a positive lens L4a1 which is configured with a plano-convex lens directing the plano surface toward the image surface side, a positive lens L4a2 which is configured with a biconvex lens directing the convex surface having a curvature larger than that of the surface of the object side toward the image surface side, a positive lens L4a3 which is configured with a biconvex lens directing the convex surface having a curvature larger than that of the surface of the object side toward the image surface side, a negative lens L4a4 which is configured with a biconcave lens directing the concave surface having a curvature larger than that of the surface of the image surface side toward the object side, and a positive lens L4a5 which is configured with a positive meniscus lens directing the convex surface toward the object side. A laminated-type diffraction optical element is configured to be in close contact with a surface 21 of the object side of a cemented surface 24 between the positive lens L4a3 and the negative lens L4a4 of the 4a-th lens group G4a.

In addition, the positive lens L4a3 and the negative lens L4a4 of the 4a-th lens group G4a are closely put together to be integrally bonded, so that a two-sheet cemented lens is formed.

In the fourth lens group G4, the 4b-th lens group G4b which is arranged at the image surface side from the position having the largest interval in the fourth lens group G4 includes, in order from the object side, a negative lens L4b1 which is configured with a negative meniscus lens directing the concave surface toward the image surface side and a positive lens L4b2 which is configured with a biconvex lens directing the convex surface having a curvature larger than that of the image surface side toward the object side.

In addition, various optical filters such as an optical low pass filter or an IR cutoff filter or a cover glass (sealing glass) for a light reception imaging device such as a CMOS image sensor or a CCD image sensor are assumed to be arranged at the image surface side of the 4b-th lens group G4b. Herein, a filter or the like FG illustrated as an equivalent transparent parallel plate is arranged.

In this case, as illustrated in FIGS. 5A-5C, during change of magnification from the short focal end to the long focal end, the first lens group G1 is fixed, the second lens group G2 is moved to the image side, the third lens group G3 is moved, and the fourth lens group G4 is fixed. As a result, the interval between the first lens group G1 and the second lens group G2 becomes large and the interval between the second lens group G2 and the third lens group G3 becomes small.

It is preferable that focusing be performed by using the first lens group G1.

This is because there is a merit in that, in the case where focusing is performed by using the first lens group, the position of the first lens group as a focusing group is the same even in any zoom range.

In Example 2, the focal length f of the entire optical system, the F number F, and the half angle of view w are changed in the respective ranges of f=7.72 to 30.01 to 116.43, F=1.65 to 1.65 to 1.88, and ω=31.95 to 8.16 to 2.12 by the zooming from the short focal end to the long focal end. Optical characteristics of each optical element are as illustrated in the following Table 5.

TABLE 5

|  | R | D | N | ν | Glass |
|---|---|---|---|---|---|
| 1 | 138.239 | 2.50 | 1.73800 | 32.26 | S-NBH53(OHARA) |
| 2* | 49.407 | 15.21 | 1.69680 | 55.53 | S-LAL14(OHARA) |
| 3 | −486.533 | 0.50 |  |  |  |
| 4 | 53.192 | 7.03 | 1.49700 | 81.54 | S-FPL51(OHARA) |
| 5 | 170.777 | DA |  |  |  |
| 6 | −578.286 | 1.20 | 1.90366 | 31.31 | TAFD25(HOYA) |
| 7 | 18.538 | 4.41 |  |  |  |
| 8 | −148.706 | 1.20 | 1.71299 | 53.87 | S-LAL8(OHARA) |
| 9 | 15.643 | 3.65 | 1.92286 | 18.90 | S-NPH2(OHARA) |
| 10 | 85.350 | 2.40 |  |  |  |
| 11 | −31.089 | 1.20 | 1.90366 | 31.31 | TAFD25(HOYA) |
| 12 | −57.794 | DB |  |  |  |
| 13 | −29.640 | 1.20 | 1.80440 | 39.59 | S-LAH63(OHARA) |
| 14 | 144.762 | 1.63 | 1.92286 | 18.90 | S-NPH2(OHARA) |
| 15 | −285.270 | DC |  |  |  |
| 16 | Aperture Diaphragm | 0.50 |  |  |  |
| 17 | 0.000 | 0.80 | 1.51633 | 64.14 | S-BSL7(OHARA) |
| 18 | 0.000 | 0.50 |  |  |  |
| 19 | 0.000 | 3.28 | 1.65160 | 58.55 | S-LAL7(OHARA) |
| 20 | −31.053 | 0.50 |  |  |  |
| 21 | 63.737 | 3.93 | 1.49700 | 81.54 | S-FPL51(OHARA) |
| 22 | −36.983 | 0.50 |  |  |  |
| 23 | 28.566 | 5.16 | 1.51633 | 64.14 | S-BSL7(OHARA) |
| 24* | −24.177 | 1.20 | 1.91082 | 35.25 | TAFD35(HOYA) |
| 25 | 69.236 | 0.50 |  |  |  |
| 26 | 16.674 | 3.21 | 1.66998 | 39.27 | S-BAH32(OHARA) |
| 27 | 41.239 | 9.20 |  |  |  |
| 28 | 22.772 | 1.29 | 1.84666 | 23.78 | S-TIH53(OHARA) |
| 29 | 10.697 | 2.12 |  |  |  |
| 30 | 29.510 | 2.71 | 1.70154 | 41.24 | S-BAH27(OHARA) |
| 31 | −34.395 | 13.50 |  |  |  |
| 32 | 0.000 | 2.70 | 1.49782 | 67.00 | Filter or the like |
| 33 | 0.000 |  |  |  |  |

In Example 2, variable amounts such as the focal length f of the entire optical system, the F value, the half angle of view w, the variable interval DA between the first lens group G1 and the second lens group G2, the variable interval DB between the second lens group G2 and the third lens group G3, the variable interval DC between the third lens group G3 and the aperture diaphragm AD, and the like are changed according to zooming, that is, moving in the short focal end (Wide), the intermediate focal length (Mean), and the long focal end (Tele) as illustrated in the following Table 6.

TABLE 6

|  | Wide | Mean | Tele |
|---|---|---|---|
| f | 7.72 | 30.01 | 116.43 |
| F Number | 1.65 | 1.65 | 1.88 |
| ω | 31.95 | 8.16 | 2.12 |
| DA | 1.5000 | 35.8139 | 51.5357 |
| DB | 52.5356 | 11.9905 | 2.4999 |
| DC | 1.2000 | 7.4312 | 1.2000 |

When the second-order and fourth-order coefficients of the phase function are denoted by C2 and C4, respectively, the focal length fdoe of the diffraction surface is expressed by:

$$fdoe = -1 (2 \times C2).$$

In Example 2, C2 of the second-order coefficient of the phase function of the diffraction surface formed on the fourth surface, that is, a surface 4 of the positive lens L13 is as illustrated by the following Table 7. In addition, C4 of the fourth-order coefficient of the phase function is also illustrated.

TABLE 7

| Coefficients of Phase Function | | |
|---|---|---|
| λ | C2 | C4 |
| 2    587.6 | −5.89518E−05 | 1.90028E−08 |
| 24   587.6 | −1.00582E−04 | −1.29627E−07 |

In addition, as described above, when a reference wavelength (d-line) is denoted by λd, a distance from an optical axis is denoted by h, and a phase is denoted by φ(h), the shape of the diffraction grating is expressed by:

$$\phi(h) = 2\pi/\lambda d (C2 \cdot h^2 + C4 \cdot h^4).$$

In the case of Example 2, the values corresponding to the aforementioned Condition Expressions (1) to (9) are as illustrated in the following Table 8 and satisfy the respective Condition Expressions (1) to (9).

TABLE 8

| Condition Expression | |
|---|---|
| f1doe/f1 (1) | 104.24 |
| f4doe/f4 (2) | 243.68 |
| f1doe/ft (1a) | 72.85 |
| f4doe/ft (2a) | 42.70 |
| $n_d$ (3) | 1.49700 |
| $v_d$ (4) | 81.54 |
| $P_{g,F} - (-0.001802 \times v_d + 0.6483)$ (5) | 0.036 |
| f4p/ft (6) | 0.41 |
| $n_d$ (3) | 1.49700 |
| $v_d$ (4) | 81.54 |
| $P_{g,F} - (-0.001802 \times v_d + 0.6483)$ (5) | 0.036 |
| f1p/ft (7) | 1.31 |
| f1/ft (8) | 0.70 |
| f4/ft (9) | 0.18 |

Figure 6:
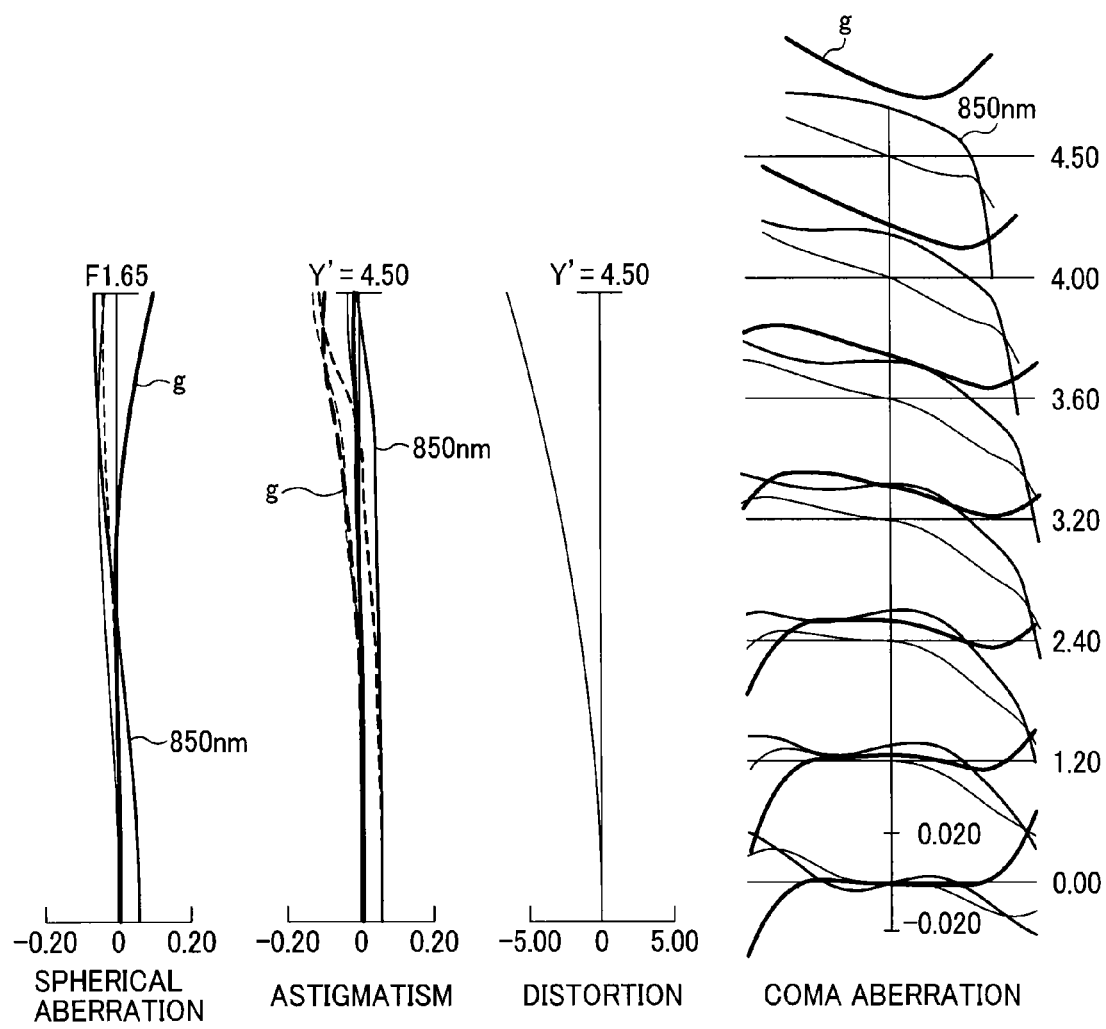
FIG. 6 is an aberration curve illustrating spherical aberration, astigmatism, distortion aberration, and coma aberration at the short focal end of the zoom lens according to Example 2 of the present invention illustrated in FIGS. 5A-5C.
Figure 7:
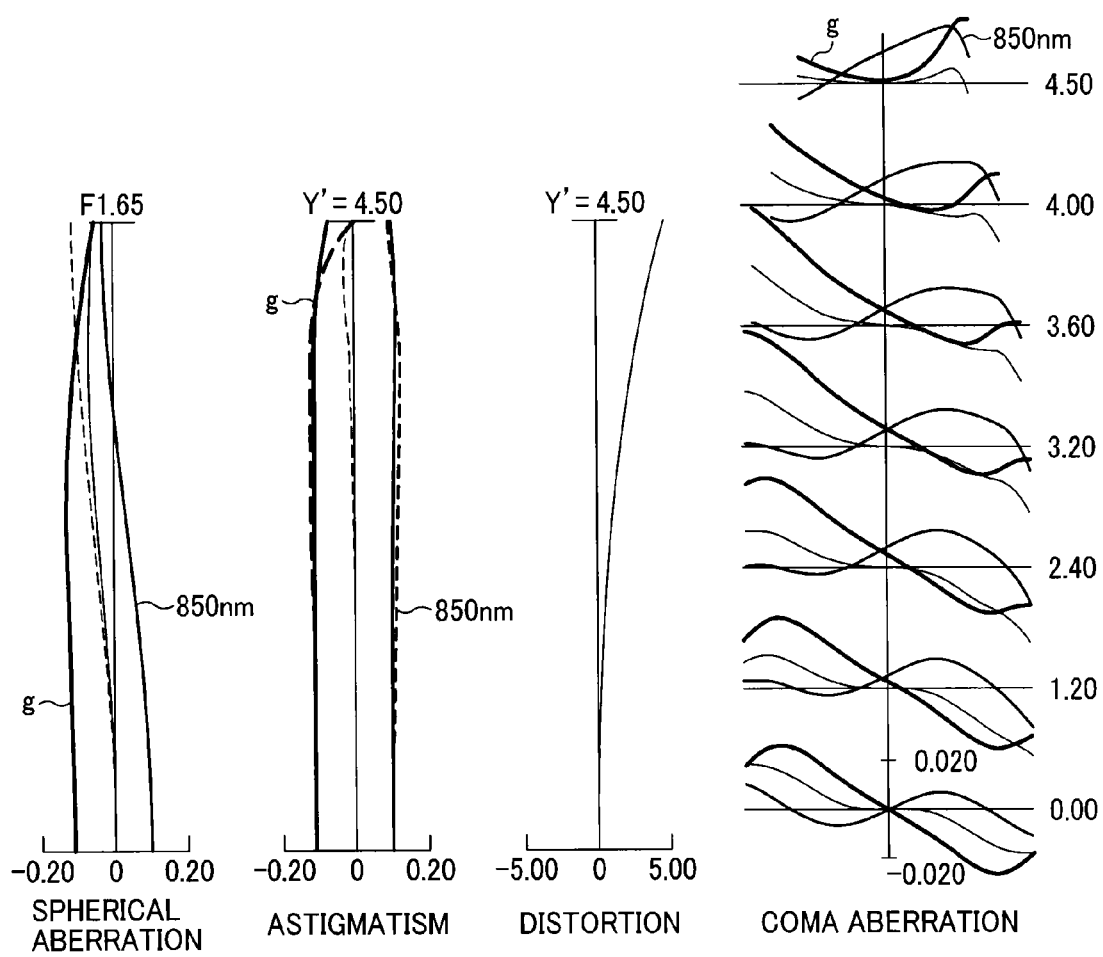
FIG. 7 is an aberration curve illustrating spherical aberration, astigmatism, distortion aberration, and coma aberration at the intermediate focal length of the zoom lens according to Example 2 of the present invention illustrated in FIGS. 5A-5C.
Figure 8:
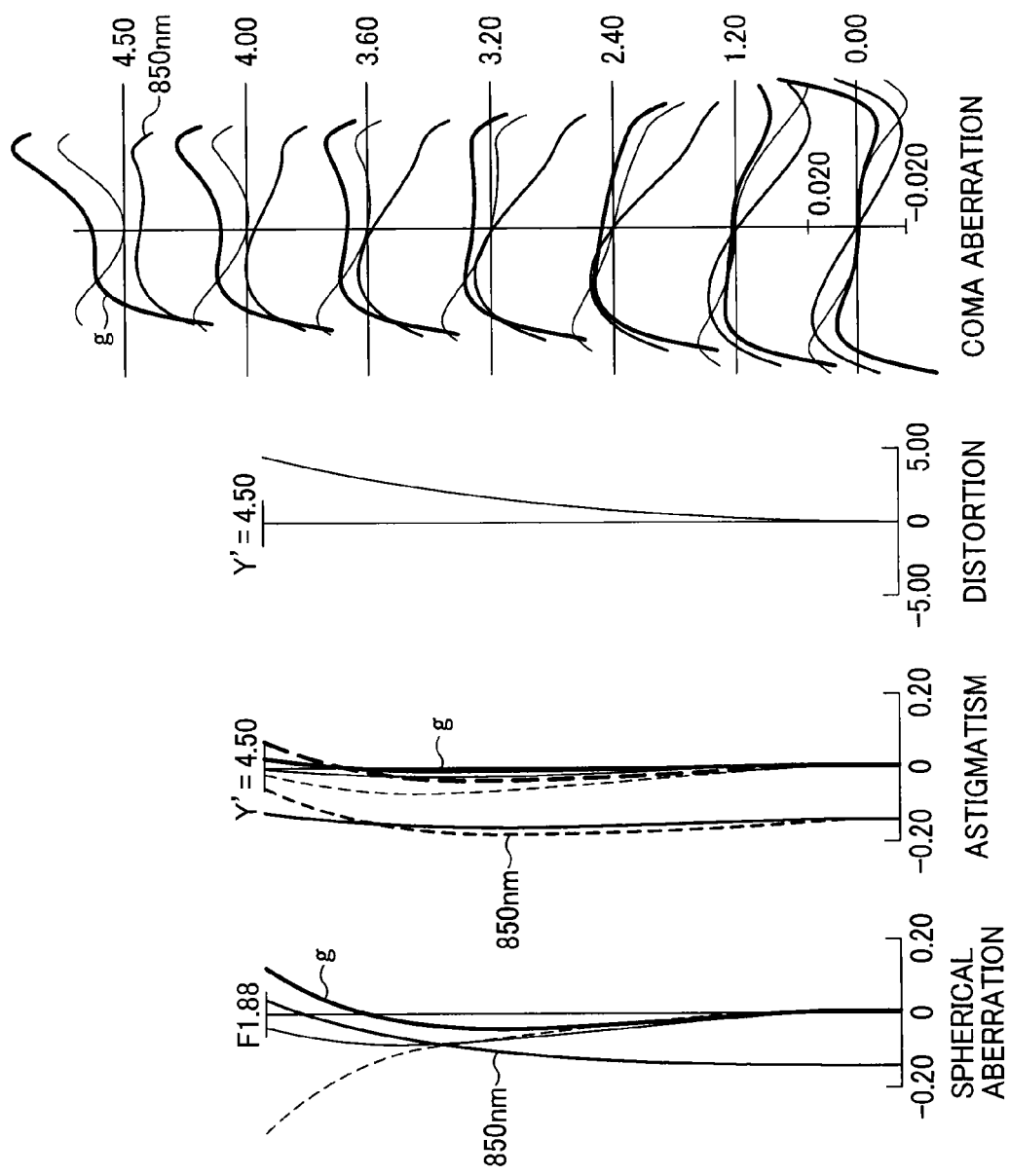
FIG. 8 is an aberration curve illustrating spherical aberration, astigmatism, distortion aberration, and coma aberration at the long focal end of the zoom lens according to Example 2 of the present invention illustrated in FIGS. 5A-5C.

In addition, FIGS. 6, 7, and 8 illustrate aberration curves of spherical aberration, astigmatism, distortion aberration, and coma aberration at the short focal end (wide angle end), the intermediate focal length, and the long focal end (telephoto end) of Example 2, respectively. In addition, in the aberration curves, a broken line of the spherical aberration curve indicates a sinusoidal condition; and a solid line and a broken line of the astigmatism graph indicate sagittal and meridional, respectively. These are the same in aberration curves of other examples.

As obvious from FIGS. 6 to 8, in the zoom lens according to Example 2, the aberrations are sufficiently corrected. Since the example may be adapted to a light receiving element of one million to five million pixels, it is obvious that, if the zoom lens is configured according to Example 2, it is possible to achieve a sufficiently small size and to secure significantly excellent imaging performance.

Example 3

Figure 9A:
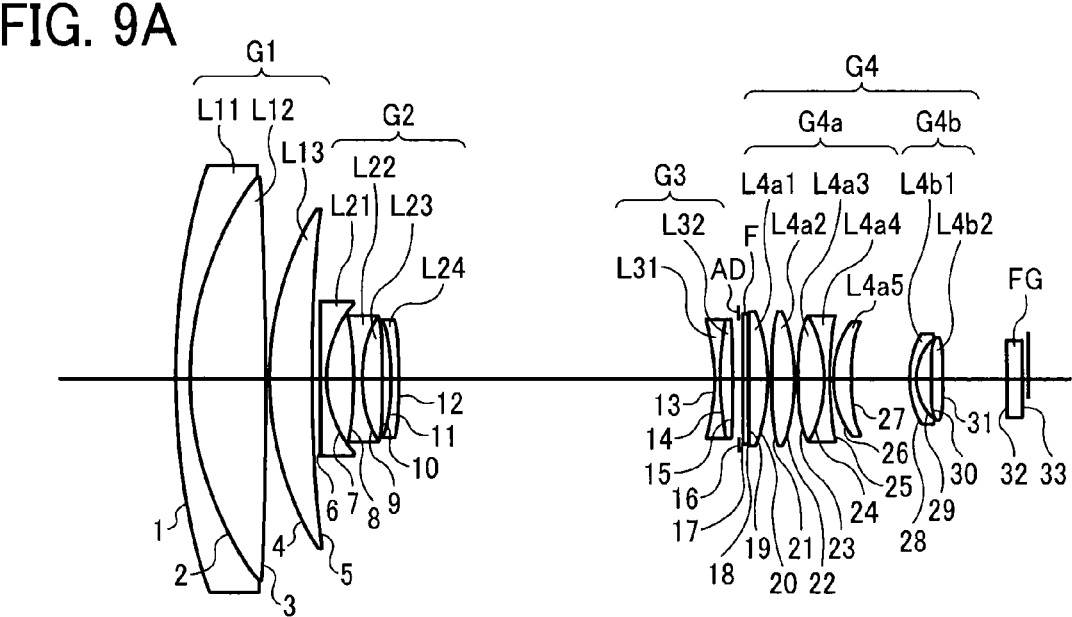
FIGS. 9A-9C are views illustrating a configuration of an optical system and a zoom locus accompanied with zooming of a zoom lens according to Example 3 of a third embodiment of the present invention.
Figure 9B:
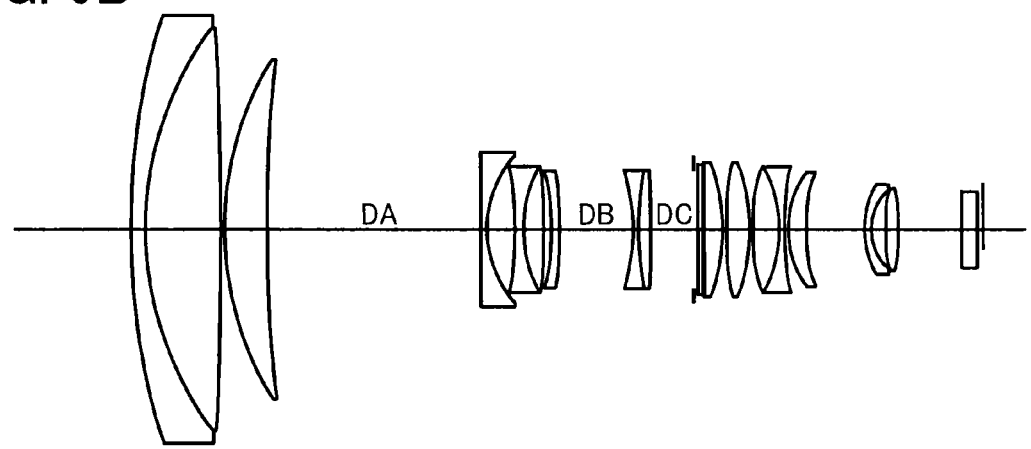
Figure 9C:
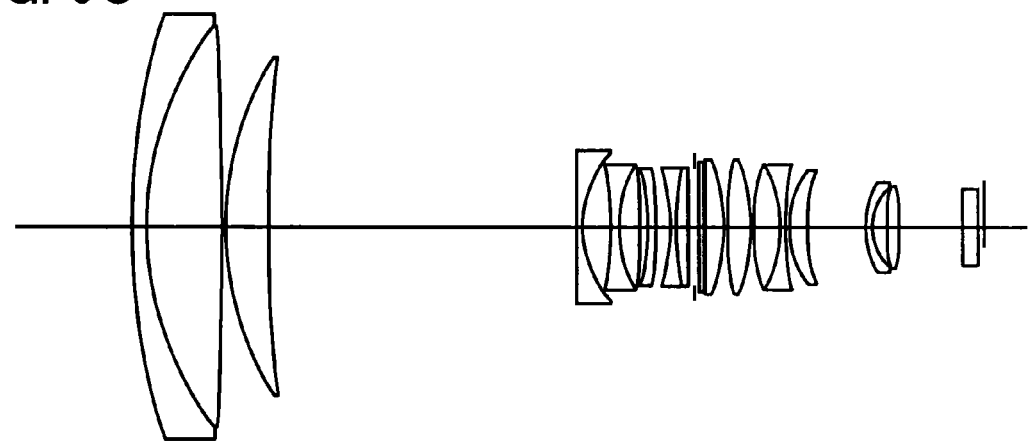

FIGS. 9A-9C illustrate a lens configuration of an optical system and a zoom locus accompanied with zooming from a short focal end, that is, a wide angle end, through a predetermined intermediate focal length to a long focal end, that is, a telephoto end of the zoom lens according to Example 3 of the third embodiment of the present invention. FIG. 9A is a cross-sectional view illustrating the short focal end, that is, the wide angle end. FIG. 9B is a cross-sectional view illustrating the predetermined intermediate focal length. FIG. 9C is a cross-sectional view illustrating the long focal end, that is, the telephoto end. In addition, in FIG. 9A-9C illustrating the arrangement of the lens group of Example 3, the left side of the illustration is the object side (subject side).

The zoom lens illustrated in FIG. 9A-9C include, in order from the object side, a first lens group G1 having a positive refractive power, a second lens group G2 having a negative refractive power, a third lens group G3 having a negative refractive power, and a fourth lens group G4 having a positive refractive power.

The fourth lens group G4 includes a 4a-th lens group G4a which is arranged at the object side from the position having the largest interval in the fourth lens group G4 and a 4b-th lens group G4b which is arranged at the image side.

The first to fourth lens groups G1 to G4 are supported by an appropriate common support frame or the like for each group; during the zooming or the like, each group of the second lens group G2 and the third lens group G3 is integrally operated; and an aperture diaphragm AD is installed integrally with the fourth lens group G4. In FIGS. 9A-9C, each optical surface is indicated by a surface number. In addition, each reference numeral in FIGS. 9A-9C is used independently of each example in order to avoid complication of the description due to an increase in digit number of reference numerals. Therefore, a component indicated by the same reference numeral in the figures associated with a different embodiment may not necessarily have the same configuration as that of the different embodiment.

During change of magnification from the short focal end (wide angle end) to the long focal end (telephoto end), the first lens group G1 is fixed, the second lens group G2 is moved to the image side, the third lens group G3 is moved, and the fourth lens group G4 is fixed. As a result, the lens groups are moved so that the interval between the first lens group G1 and the second lens group G2 becomes large and the interval between the second lens group G2 and the third lens group G3 becomes small.

In the third embodiment of the present invention illustrated in FIGS. 9A-9C, the first lens group G1 of the zoom lens according to Example (numerical example: hereinafter, the same) 3 includes, in order from the object side, a negative lens L11 which is configured with a negative meniscus lens directing the concave surface toward the image surface side, a positive lens L12 which is configured with a biconvex lens directing the convex surface having a curvature larger than that of the image surface side toward the object side, and a positive lens L13 which is configured with a positive meniscus lens directing the convex surface toward the object side.

A laminated-type diffraction optical element is configured to be in close contact with the lens surface of the first lens group G1, in the case of this example, a cemented surface 2 between the negative lens L11 and the positive lens L12.

In addition, the two lenses of the negative lens L11 and the positive lens L12 of the first lens group G1 are closely put together to be integrally bonded, so that a two-sheet cemented lens is formed.

The second lens group G2 includes, in order from the object side, a negative lens L21 which is configured with a negative meniscus lens directing the concave surface toward the image surface side, a negative lens L22 which is configured with a biconcave lens directing the concave surface having a curvature larger than that of the surface of the object side toward the image surface side, a positive lens L23 which is configured with a positive meniscus lens directing the convex surface toward the image surface side, and a negative lens L24 which is configured with a negative meniscus lens directing the concave surface toward the object side. The two lenses of the positive lens L23 and the negative lens L24 of the second lens group G2 are closely put together to be integrally bonded, so that a two-sheet cemented lens is formed.

The third lens group G3 includes a negative lens L31 which is configured with a biconcave lens directing the concave surface having a curvature larger than that of the image surface side toward the object side and a positive lens L32 which is configured with a biconvex lens directing the convex surface having a curvature larger than that of the image surface side toward the object side.

In addition, the two lenses of the negative lens L31 and the positive lens L32 of the third lens group G3 are closely put together to be integrally bonded, so that a two-sheet cemented lens is formed.

An aperture diaphragm AD and various filters F such as an ND filter which is adjacent to the aperture diaphragm AD and is configured with a parallel plate are inserted between the third lens group G3 and the fourth lens group G4 to be retained integrally with the fourth lens group G4.

In the fourth lens group G4, the 4a-th lens group G4a which is arranged at the object side from the position having the largest interval in the fourth lens group G4 includes, in order from the object side, a positive lens L4a1 which is configured with a biconvex lens directing the convex surface having a curvature larger than that of the surface of the object side toward the image surface side, a positive lens L4a2 which is configured with a biconvex lens directing the convex surface having a curvature larger than that of the surface of the object side toward the image surface side, a positive lens L4a3 which is configured with a biconvex lens directing the convex surface having a curvature larger than that of the image surface side toward the object side, a negative lens L4a4 which is configured with a biconcave lens directing the concave surface having a curvature larger than that of the surface of the image surface side toward the object side, and a positive lens L4a5 which is configured with a positive meniscus lens directing the convex surface toward the object side. A laminated-type diffraction optical element is configured to be in close contact with a cemented surface 24 between the positive lens L4a3 and the negative lens L4a4 of the 4a-th lens group G4a.

In addition, the positive lens L4a3 and the negative lens L4a4 of the 4a-th lens group G4a are closely put together to be integrally bonded, so that a two-sheet cemented lens is formed.

In the fourth lens group G4, the 4b-th lens group G4b which is arranged at the image surface side from the position having the largest interval in the fourth lens group G4 includes, in order from the object side, a negative lens L4b1 which is configured with a negative meniscus lens directing the concave surface toward the image surface side and a positive lens L4b2 which is configured with a biconvex lens directing the convex surface having a curvature larger than that of the image surface side toward the object side.

In addition, various optical filters such as an optical low pass filter or an IR cutoff filter or a cover glass (sealing glass) for a light reception imaging device such as a CMOS image sensor or a CCD image sensor are assumed to be arranged at the image surface side of the 4b-th lens group G4b. Herein, a filter or the like FG illustrated as an equivalent transparent parallel plate is arranged.

In this case, as illustrated in FIGS. 9A-9C, during change of magnification from the short focal end to the long focal end, the first lens group G1 is fixed, the second lens group G2 is moved to the image side, the third lens group G3 is moved, and the fourth lens group G4 is fixed. As a result, the interval between the first lens group G1 and the second lens group G2 becomes large and the interval between the second lens group G2 and the third lens group G3 becomes small.

It is preferable that focusing be performed by using the first lens group G1.

This is because there is a merit in that, in the case where focusing is performed by using the first lens group, the position of the first lens group as a focusing group is the same even in any zoom range.

In Example 3, the focal length f of the entire optical system, the F number F, and the half angle of view ω are changed in the respective ranges of f=7.72 to 29.99 to 116.37, F=1.64 to 1.63 to 1.87, and ω=31.59 to 8.08 to 2.10 by the zooming from the short focal end to the long focal end. Optical characteristics of each optical element are as illustrated in the following Table 9.

TABLE 9

|  | R | D | N | ν | Glass |
|---|---|---|---|---|---|
| 1 | 134.570 | 2.50 | 1.80000 | 29.84 | S-NBH55(OHARA) |
| 2* | 58.031 | 13.39 | 1.67790 | 55.34 | S-LAL12(OHARA) |
| 3 | −492.136 | 0.50 | | | |
| 4 | 55.584 | 7.41 | 1.49700 | 81.54 | S-FPL51(OHARA) |
| 5 | 213.027 | DA | | | |
| 6 | 567.330 | 1.20 | 1.90366 | 31.31 | TAFD25(HOYA) |
| 7 | 19.535 | 5.08 | | | |
| 8 | −49.624 | 1.20 | 1.71299 | 53.87 | S-LAL8(OHARA) |
| 9 | 20.587 | 3.60 | 1.92286 | 18.90 | S-NPH2(OHARA) |
| 10 | −283.164 | 1.67 | | | |
| 11 | −34.769 | 1.20 | 1.90366 | 31.31 | TAFD25(HOYA) |
| 12 | −98.021 | DB | | | |
| 13 | −31.739 | 1.20 | 1.80440 | 39.59 | S-LAH63(OHARA) |
| 14 | 66.344 | 1.91 | 1.92286 | 18.90 | S-NPH2(OHARA) |
| 15 | −572.957 | DC | | | |
| 16 | Aperture Diaphragm | 0.50 | | | |
| 17 | 0.000 | 0.80 | 1.51633 | 64.14 | S-BSL7(OHARA) |
| 18 | 0.000 | 0.50 | | | |
| 19 | 17516.481 | 3.16 | 1.69680 | 55.53 | S-LAL14(OHARA) |
| 20 | −32.729 | 0.50 | | | |
| 21 | 56.430 | 3.91 | 1.49700 | 81.54 | S-FPL51(OHARA) |
| 22 | −38.943 | 0.50 | | | |
| 23 | 26.758 | 4.90 | 1.51633 | 64.14 | S-BSL7(OHARA) |
| 24* | −27.091 | 1.20 | 1.90366 | 31.31 | TAFD25(HOYA) |

TABLE 9-continued

| | R | D | N | ν | Glass |
|---|---|---|---|---|---|
| 25 | 54.083 | 0.50 | | | |
| 26 | 16.143 | 3.16 | 1.69680 | 55.53 | S-LAL14(OHARA) |
| 27 | 33.009 | 10.00 | | | |
| 28 | 16.341 | 1.37 | 1.85026 | 32.27 | S-LAH71(OHARA) |
| 29 | 9.229 | 2.54 | | | |
| 30 | 26.709 | 2.48 | 1.63930 | 44.87 | S-BAM12(OHARA) |
| 31 | −37.199 | 11.10 | | | |
| 32 | 0.000 | 2.70 | 1.49782 | 67.00 | Filter or the like |
| 33 | 0.000 | | | | |

In Example 3, variable amounts such as the focal length f of the entire optical system, the F value, the half angle of view ω, the variable interval DA between the first lens group G1 and the second lens group G2, the variable interval DB between the second lens group G2 and the third lens group G3, the variable interval DC between the third lens group G3 and the aperture diaphragm AD, and the like are changed according to zooming, that is, moving in the short focal end (Wide), the intermediate focal length (Mean), and the long focal end (Tele) as illustrated in the following Table 10.

TABLE 10

| | Wide | Mean | Tele |
|---|---|---|---|
| f | 7.72 | 29.99 | 116.37 |
| F Number | 1.64 | 1.63 | 1.87 |
| ω | 31.59 | 8.08 | 2.10 |
| DA | 1.4904 | 37.7953 | 54.4721 |
| DB | 55.6182 | 12.6783 | 2.6338 |
| DC | 1.2001 | 7.8330 | 1.2000 |

When the second-order and fourth-order coefficients of the phase function are denoted by C2 and C4, respectively, the focal length fdoe of the diffraction surface is expressed by:

$$fdoe = -1/(2 \times C2).$$

In Example 3, C2 of the second-order coefficient of the phase function of the diffraction surface formed on each of the second surface and the 24-th surface, that is, the cemented surface between the negative lens L11 and the positive lens L12 and the cemented surface 24 between the positive lens L4a3 and the negative lens L4a4 is as illustrated by the following Table 11. In addition, C4 of the fourth-order coefficient of the phase function is also illustrated.

TABLE 11

| Coefficients of Phase Function | | |
|---|---|---|
| λ | C2 | C4 |
| 2 587.6 | −5.10902E−05 | 1.16030E−08 |
| 24 587.6 | −1.27404E−04 | 5.28978E−07 |

In addition, as described above, when a reference wavelength (d-line) is denoted by λd, a distance from an optical axis is denoted by h, and a phase is denoted by φ(h), the shape of the diffraction grating is expressed by:

$$\phi(h) = 2\pi/\lambda d (C2 \cdot h^2 + C4 \cdot h^4).$$

In the case of Example 3, the values corresponding to the aforementioned Condition Expressions (1) to (9) are as illustrated in the following Table 12 and satisfy the respective Condition Expressions (1) to (9).

TABLE 12

| Condition Expression | |
|---|---|
| f1doe/f1 (1) | 115.18 |
| f4doe/f4 (2) | 192.97 |
| f1doe/ft (1a) | 4.10 |
| f4doe/ft (2a) | 33.72 |
| $n_d$ (3) | 1.49700 |
| $v_d$ (4) | 81.54 |
| $P_{g,F} - (-0.001802 \times v_d + 0.6483)$ (5) | 0.036 |
| f4p/ft (6) | 0.40 |
| $n_d$ (3) | 1.49700 |
| $v_d$ (4) | 81.54 |
| $P_{g,F} - (-0.001802 \times v_d + 0.6483)$ (5) | 0.036 |
| f1p/ft (7) | 1.28 |
| f1/ft (8) | 0.73 |
| f4/ft (9) | 0.17 |

Figure 10:
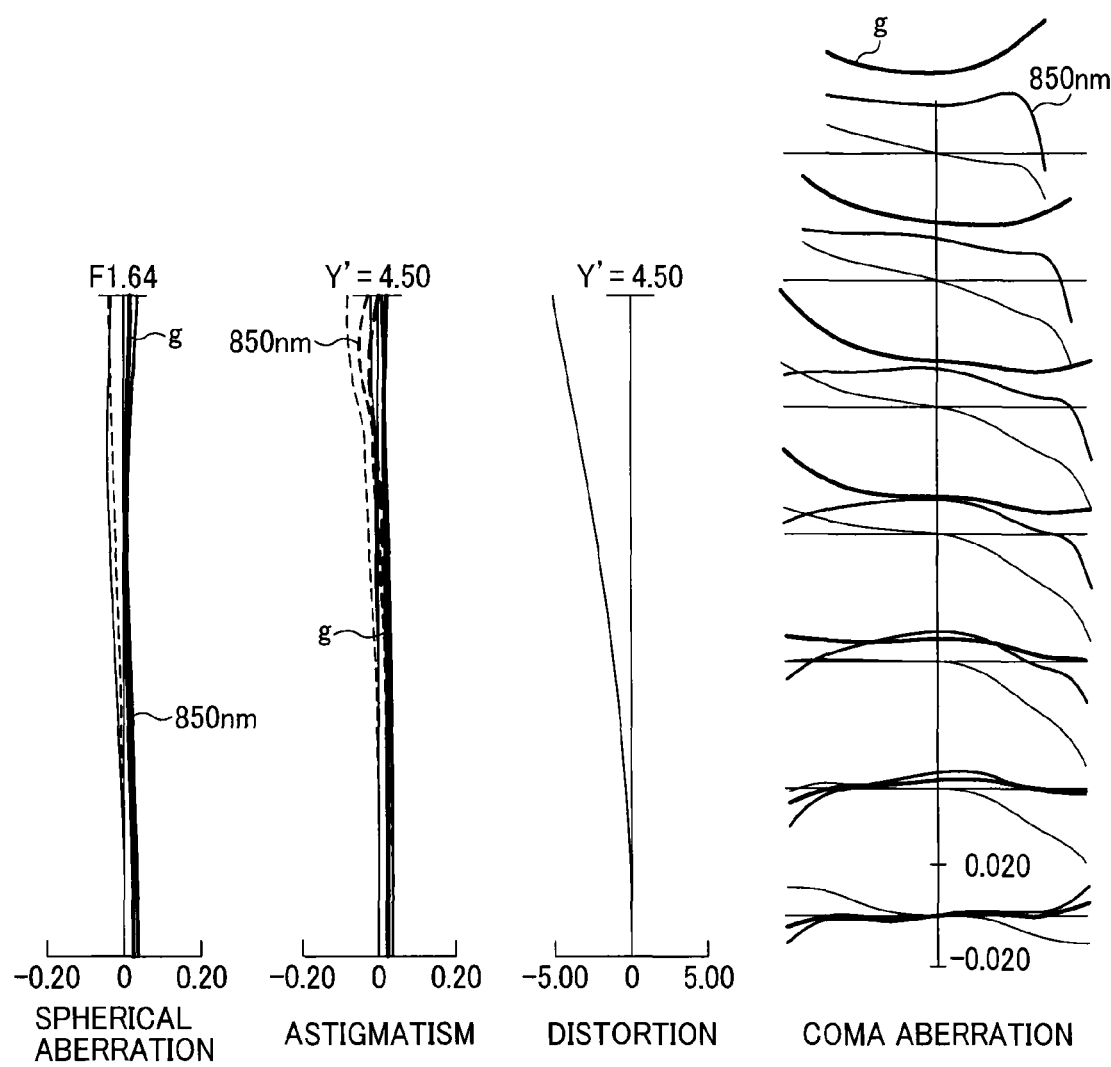
FIG. 10 is an aberration curve illustrating spherical aberration, astigmatism, distortion aberration, and coma aberration at the short focal end of the zoom lens according to Example 3 of the present invention illustrated in FIGS. 9A-9C.
Figure 11:
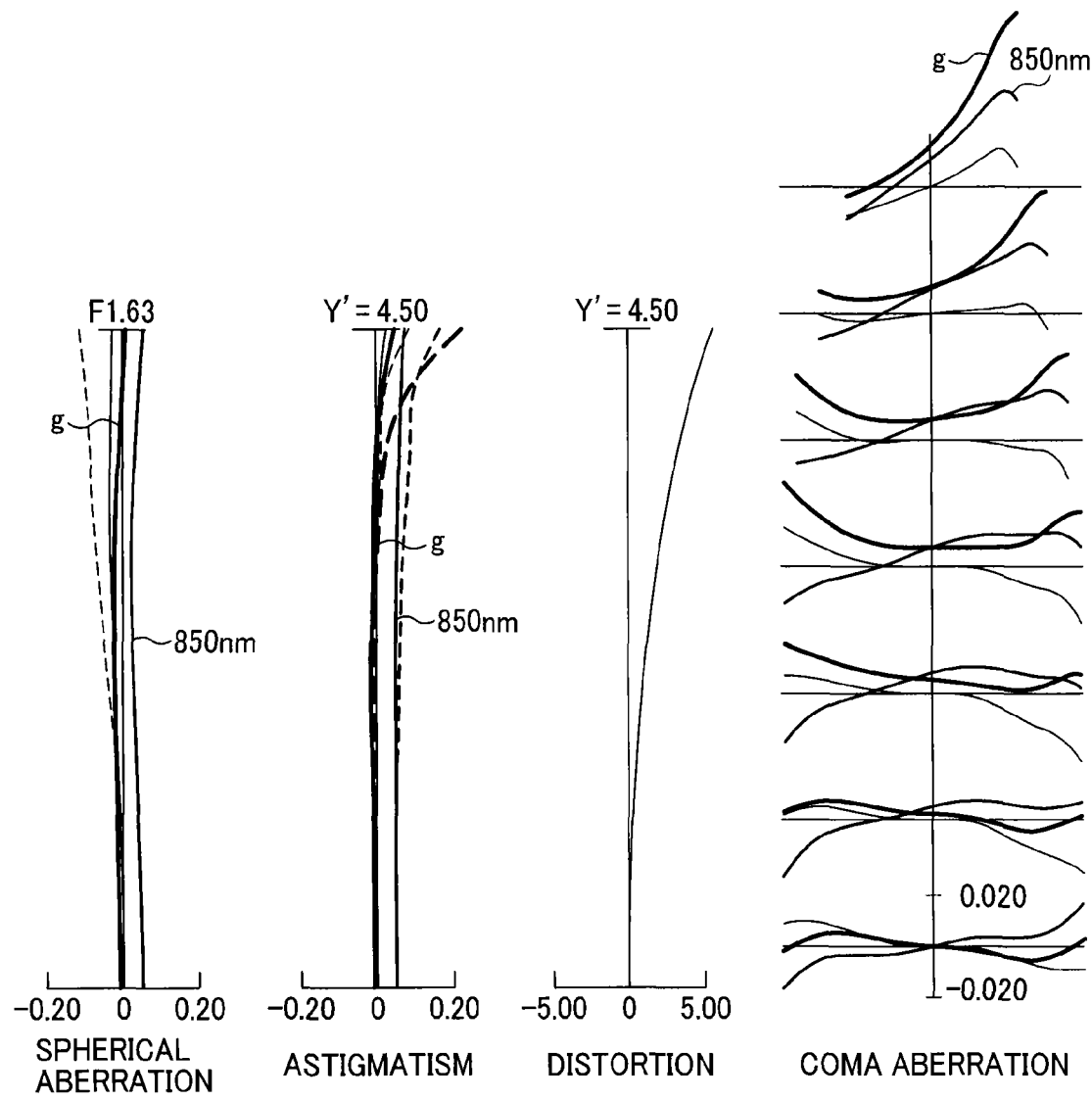
FIG. 11 is an aberration curve illustrating spherical aberration, astigmatism, distortion aberration, and coma aberration at the intermediate focal length of the zoom lens according to Example 3 of the present invention illustrated in FIGS. 9A-9C.
Figure 12:
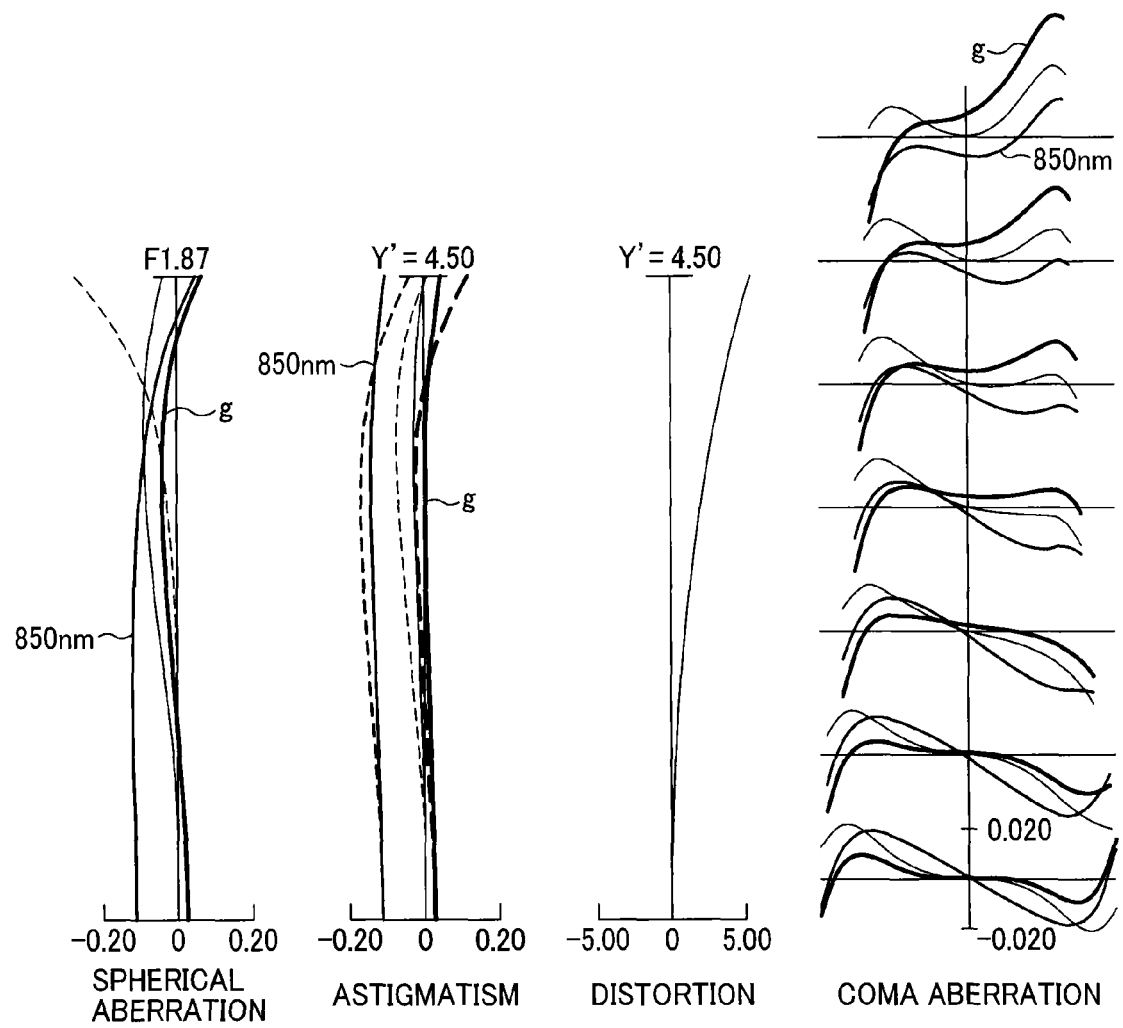
FIG. 12 is an aberration curve illustrating spherical aberration, astigmatism, distortion aberration, and coma aberration at the long focal end of the zoom lens according to Example 3 of the present invention illustrated in FIGS. 9A-9C.

In addition, FIGS. 10, 11, and 12 illustrate aberration curves of spherical aberration, astigmatism, distortion aberration, and coma aberration at the short focal end (wide angle end), the intermediate focal length, and the long focal end (telephoto end) of Example 3, respectively. In addition, in the aberration curves, a broken line of the spherical aberration curve indicates a sinusoidal condition; and a solid line and a broken line of the astigmatism graph indicate sagittal and meridional, respectively. These are the same in aberration curves of other examples.

As obvious from FIGS. 10 to 12, in the zoom lens according to Example 3, the aberrations are sufficiently corrected. Since the example may be adapted to a light receiving element of one million to five million pixels, it is obvious that, if the zoom lens is configured according to Example 3, it is possible to achieve a sufficiently small size and to secure significantly excellent imaging performance.

Example 4

Figure 13A:
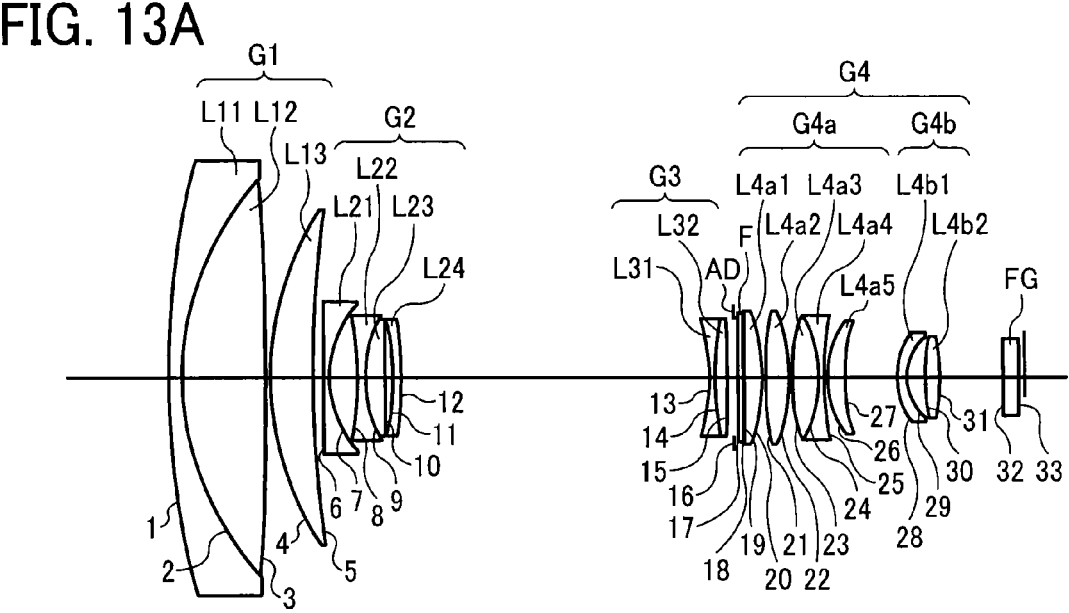
FIGS. 13A-13C are views illustrating a configuration of an optical system and a zoom locus accompanied with zooming of a zoom lens according to Example 4 of a fourth embodiment of the present invention.
Figure 13B:
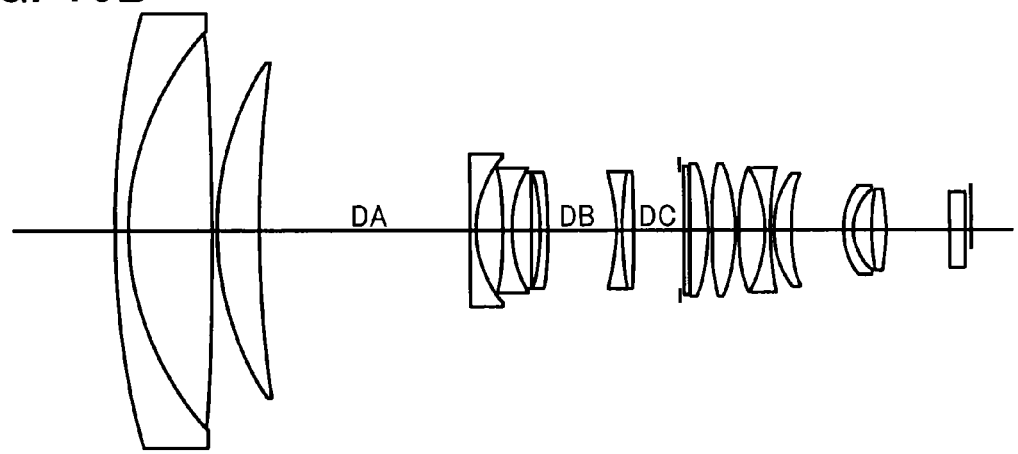
Figure 13C:
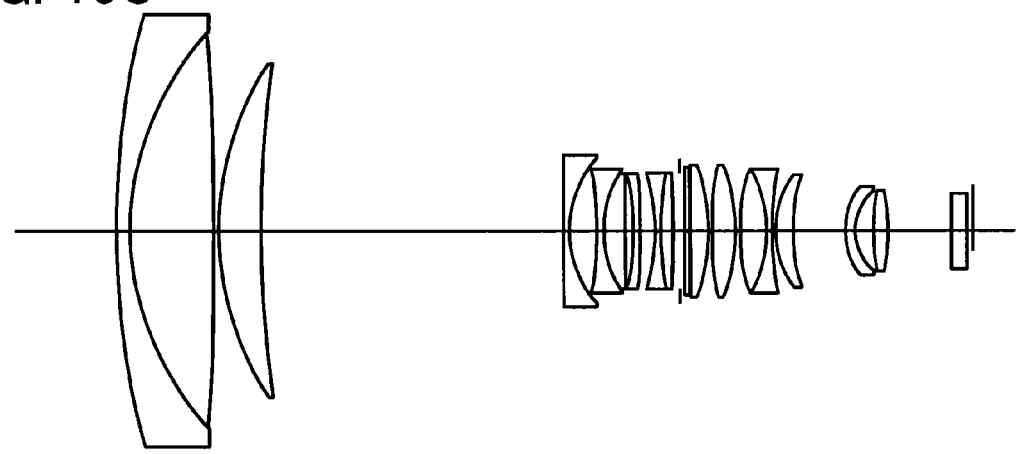

FIGS. 13A-13C illustrate a lens configuration of an optical system and a zoom locus accompanied with zooming from a short focal end, that is, a wide angle end, through a predetermined intermediate focal length to a long focal end, that is, a telephoto end of the zoom lens according to Example 4 of the fourth embodiment of the present invention. FIG. 13A is a cross-sectional view illustrating the short focal end, that is, the wide angle end. FIG. 13B is a cross-sectional view illustrating the predetermined intermediate focal length. FIG. 13C is a cross-sectional view illustrating the long focal end, that is, the telephoto end. In addition, in FIGS. 13A-13C illustrating the arrangement of the lens group of Example 4, the left side of the illustration is the object side (subject side).

The zoom lens illustrated in FIGS. 13A-13C include, in order from the object side, a first lens group G1 having a positive refractive power, a second lens group G2 having a negative refractive power, a third lens group G3 having a negative refractive power, and a fourth lens group G4 having a positive refractive power.

The fourth lens group G4 includes a 4a-th lens group G4a which is arranged at the object side from the position having the largest interval in the fourth lens group G4 and a 4b-th lens group G4b which is arranged at the image side.

The first to fourth lens groups G1 to G4 are supported by an appropriate common support frame or the like for each group; during the zooming or the like, each group of the second lens group G2 and the third lens group G3 is integrally operated; and an aperture diaphragm AD is installed integrally with the fourth lens group G4. In FIGS. 13A-13C, each optical surface is indicated by a surface number. In addition, each reference numeral in FIGS. 13A-13C is used independently of each example in order to avoid complication of the description due to an increase in digit number of reference numerals. Therefore, a component indicated by the same reference numeral in the figures associated with a different embodiment may not necessarily have the same configuration as that of the different embodiment.

During change of magnification from the short focal end (wide angle end) to the long focal end (telephoto end), the first lens group G1 is fixed, the second lens group G2 is moved to the image side, the third lens group G3 is moved, and the fourth lens group G4 is fixed. As a result, the lens groups are moved so that the interval between the first lens group G1 and the second lens group G2 becomes large and the interval between the second lens group G2 and the third lens group G3 becomes small.

In the fourth embodiment of the present invention illustrated in FIGS. 13A-13C, the first lens group G1 of the zoom lens according to Example (numerical example: hereinafter, the same) 4 includes, in order from the object side, a negative lens L11 which is configured with a negative meniscus lens directing the concave surface toward the image surface side, a positive lens L12 which is configured with a biconvex lens directing the convex surface having a curvature larger than that of the image surface side toward the object side, and a positive lens L13 which is configured with a positive meniscus lens directing the convex surface toward the object side.

A laminated-type diffraction optical element is configured to be in close contact with the lens surface of the first lens group G1, in the case of this example, a cemented surface 2 between the negative lens L11 and the positive lens L12.

In addition, the two lenses of the negative lens L11 and the positive lens L12 of the first lens group G1 are closely put together to be integrally bonded, so that a two-sheet cemented lens is formed.

The second lens group G2 includes, in order from the object side, a negative lens L21 which is configured with a negative meniscus lens directing the concave surface toward the image surface side, a negative lens L22 which is configured with a biconcave lens directing the concave surface having a curvature larger than that of the surface of the object side toward the image surface side, a positive lens L23 which is configured with a positive meniscus lens directing the convex surface toward the image surface side, and a negative lens L24 which is configured with a negative meniscus lens directing the concave surface toward the object side. The two lenses of the positive lens L23 and the negative lens L24 of the second lens group G2 are closely put together to be integrally bonded, so that a two-sheet cemented lens is formed.

The third lens group G3 includes a negative lens L31 which is configured with a biconcave lens directing the concave surface having a curvature larger than that of the image surface side toward the object side and a positive lens L32 which is configured with a biconvex lens directing the convex surface having a curvature larger than that of the image surface side toward the object side.

In addition, the two lenses of the negative lens L31 and the positive lens L32 of the third lens group G3 are closely put together to be integrally bonded, so that a two-sheet cemented lens is formed.

An aperture diaphragm AD and various filters F such as an ND filter which is adjacent to the aperture diaphragm AD and is configured with a parallel plate are inserted between the third lens group G3 and the fourth lens group G4 to be retained integrally with the fourth lens group G4.

In the fourth lens group G4, the 4a-th lens group G4a which is arranged at the object side from the position having the largest interval in the fourth lens group G4 includes, in order from the object side, a positive lens L4a1 which is configured with a negative meniscus lens directing the convex surface toward the image surface side, a positive lens L4a2 which is configured with a biconvex lens directing the convex surface having a curvature larger than that of the surface of the object side toward the image surface side, a positive lens L4a3 which is configured with a biconvex lens directing the convex surface having a curvature larger than that of the surface of the object side toward the image surface side, a negative lens L4a4 which is configured with a biconcave lens directing the concave surface having a curvature larger than that of the surface of the image surface side toward the object side, and a positive lens L4a5 which is configured with a positive meniscus lens directing the convex surface toward the object side. A laminated-type diffraction optical element is configured to be in close contact with a cemented surface 24 between the positive lens L4a3 and the negative lens L4a4 of the 4a-th lens group G4a.

In addition, the positive lens L4a3 and the negative lens L4a4 of the 4a-th lens group G4a are closely put together to be integrally bonded, so that a two-sheet cemented lens is formed.

In the fourth lens group G4, the 4b-th lens group G4b which is arranged at the image surface side from the position having the largest interval in the fourth lens group G4 includes, in order from the object side, a negative lens L4b1 which is configured with a negative meniscus lens directing the concave surface toward the image surface side and a positive lens L4b2 which is configured with a biconvex lens directing the convex surface having a curvature larger than that of the image surface side toward the object side.

In addition, various optical filters such as an optical low pass filter or an IR cutoff filter or a cover glass (sealing glass) for a light reception imaging device such as a CMOS image sensor or a CCD image sensor are assumed to be arranged at the image surface side of the 4b-th lens group G4b. Herein, a filter or the like FG illustrated as an equivalent transparent parallel plate is arranged.

In this case, as illustrated in FIGS. 13A-13C, during change of magnification from the short focal end to the long focal end, the first lens group G1 is fixed, the second lens group G2 is moved to the image side, the third lens group G3 is moved, and the fourth lens group G4 is fixed. As a result, the interval between the first lens group G1 and the second lens group G2 becomes large and the interval between the second lens group G2 and the third lens group G3 becomes small.

It is preferable that focusing be performed by using the first lens group G1.

This is because there is a merit in that, in the case where focusing is performed by using the first lens group, the position of the first lens group as a focusing group is the same even in any zoom range.

In Example 4, the focal length f of the entire optical system, the F number F, and the half angle of view ω are changed in the respective ranges of f=7.72 to 29.99 to 116.37, F=1.63 to 1.63 to 1.88, and ω=31.75 to 8.14 to 2.11 by the zooming from the short focal end to the long focal end. Optical characteristics of each optical element are as illustrated in the following Table 13.

TABLE 13

|   | R | D | N | ν | Glass |
|---|---|---|---|---|---|
| 1 | 145.905 | 2.50 | 1.73800 | 32.26 | S-NBH53(OHARA) |
| 2* | 50.721 | 14.83 | 1.67790 | 55.34 | S-LAL12(OHARA) |
| 3 | −513.192 | 0.50 | | | |

TABLE 13-continued

| | R | D | N | ν | Glass |
|---|---|---|---|---|---|
| 4 | 53.565 | 7.64 | 1.49700 | 81.54 | S-FPL51(OHARA) |
| 5 | 220.914 | DA | | | |
| 6 | 979.163 | 1.20 | 1.90366 | 31.31 | TAFD25(HOYA) |
| 7 | 18.684 | 4.96 | | | |
| 8 | −50.290 | 1.20 | 1.71299 | 53.87 | S-LAL8(OHARA) |
| 9 | 19.759 | 3.47 | 1.92286 | 18.90 | S-NPH2(OHARA) |
| 10 | −910.364 | 1.79 | | | |
| 11 | −33.015 | 1.20 | 1.90366 | 31.31 | TAFD25(HOYA) |
| 12 | −72.365 | DB | | | |
| 13 | −29.887 | 1.20 | 1.80440 | 39.59 | S-LAH63(OHARA) |
| 14 | 94.985 | 1.78 | 1.92286 | 18.90 | S-NPH2(OHARA) |
| 15 | −310.584 | DC | | | |
| 16 | Aperture Diaphragm | 0.52 | | | |
| 17 | 0.000 | 0.80 | 1.51633 | 64.14 | S-BSL7(OHARA) |
| 18 | 0.000 | 0.50 | | | |
| 19 | −3299.650 | 3.17 | 1.69680 | 55.53 | SLAL14(OHARA) |
| 20 | −32.971 | 0.50 | | | |
| 21 | 58.334 | 4.09 | 1.49700 | 81.54 | S-FPL51(OHARA) |
| 22 | −36.421 | 0.50 | | | |
| 23 | 27.626 | 5.06 | 1.51633 | 64.14 | S-BSL7(OHARA) |
| 24* | −25.741 | 1.20 | 1.91082 | 35.25 | TAFD35(HOYA) |
| 25 | 60.267 | 0.50 | | | |
| 26 | 16.391 | 2.97 | 1.69680 | 55.53 | S-LAL14(OHARA) |
| 27 | 35.898 | 9.31 | | | |
| 28 | 14.076 | 1.67 | 1.84666 | 23.78 | S-TIH53(OHARA) |
| 29 | 8.778 | 3.39 | | | |
| 30 | 31.567 | 2.37 | 1.60562 | 43.71 | S-BAM4(OHARA) |
| 31 | −38.154 | 11.10 | | | |
| 32 | 0.000 | 2.70 | 1.49782 | 67.00 | Filter or the like |
| 33 | 0.000 | | | | |

In Example 4, variable amounts such as the focal length f of the entire optical system, the F value, the half angle of view ω, the variable interval DA between the first lens group G1 and the second lens group G2, the variable interval DB between the second lens group G2 and the third lens group G3, the variable interval DC between the third lens group G3 and the aperture diaphragm AD, and the like are changed according to zooming, that is, moving in the short focal end (Wide), the intermediate focal length (Mean), and the long focal end (Tele) as illustrated in the following Table 14.

TABLE 14

| | Wide | Mean | Tele |
|---|---|---|---|
| f | 7.72 | 29.99 | 116.37 |
| F Number | 1.63 | 1.63 | 1.88 |
| ω | 31.75 | 8.14 | 2.11 |
| DA | 1.5000 | 36.5463 | 52.5988 |
| DB | 53.6914 | 12.2779 | 2.5927 |
| DC | 1.2000 | 7.5673 | 1.2000 |

When the second-order and fourth-order coefficients of the phase function are denoted by C2 and C4, respectively, the focal length fdoe of the diffraction surface is expressed by:

$$fdoe = -1/(2 \times C2).$$

In Example 4, C2 of the second-order coefficient of the phase function of the diffraction surface formed on each of the second surface and the 24-th surface, that is, the cemented surface between the negative lens L11 and the positive lens L12 and the cemented surface 24 between the positive lens L4a3 and the negative lens L4a4 is as illustrated by the following Table 15. In addition, C4 of the fourth-order coefficient of the phase function is also illustrated.

TABLE 15

| Coefficients of Phase Function | | |
|---|---|---|
| λ | C2 | C4 |
| 2 | 587.6 | −5.25093E−05 | 1.96625E−08 |
| 24 | 587.6 | −1.20000E−04 | 7.27713E−08 |

In addition, as described above, when a reference wavelength (d-line) is denoted by λd, a distance from an optical axis is denoted by h, and a phase is denoted by φ(h), the shape of the diffraction grating is expressed by:

$$\phi(h) = 2\pi/\lambda d \cdot (C2 \cdot h^2 + C4 \cdot h^4).$$

In the case of Example 4, the values corresponding to the aforementioned Condition Expressions (1) to (9) are as illustrated in the following Table 16 and satisfy the respective Condition Expressions (1) to (9).

TABLE 16

| Condition Expression | |
|---|---|
| f1doe/f1 (1) | 115.45 |
| f4doe/f4 (2) | 207.40 |
| f1doe/ft (1a) | 81.83 |
| f4doe/ft (2a) | 35.81 |
| $n_d$ (3) | 1.49700 |
| $\nu_d$ (4) | 81.54 |
| $P_{g,F}$ − (−0.001802 × $\nu_d$ + 0.6483) (5) | 0.036 |
| f4p/ft (6) | 0.39 |
| $n_d$ (3) | 1.49700 |
| $\nu_d$ (4) | 81.54 |
| $P_{g,F}$ − (−0.001802 × $\nu_d$ + 0.6483) (5) | 0.036 |
| f1p/ft (7) | 1.20 |
| f1/ft (8) | 0.71 |
| f4/ft (9) | 0.17 |

Figure 14:
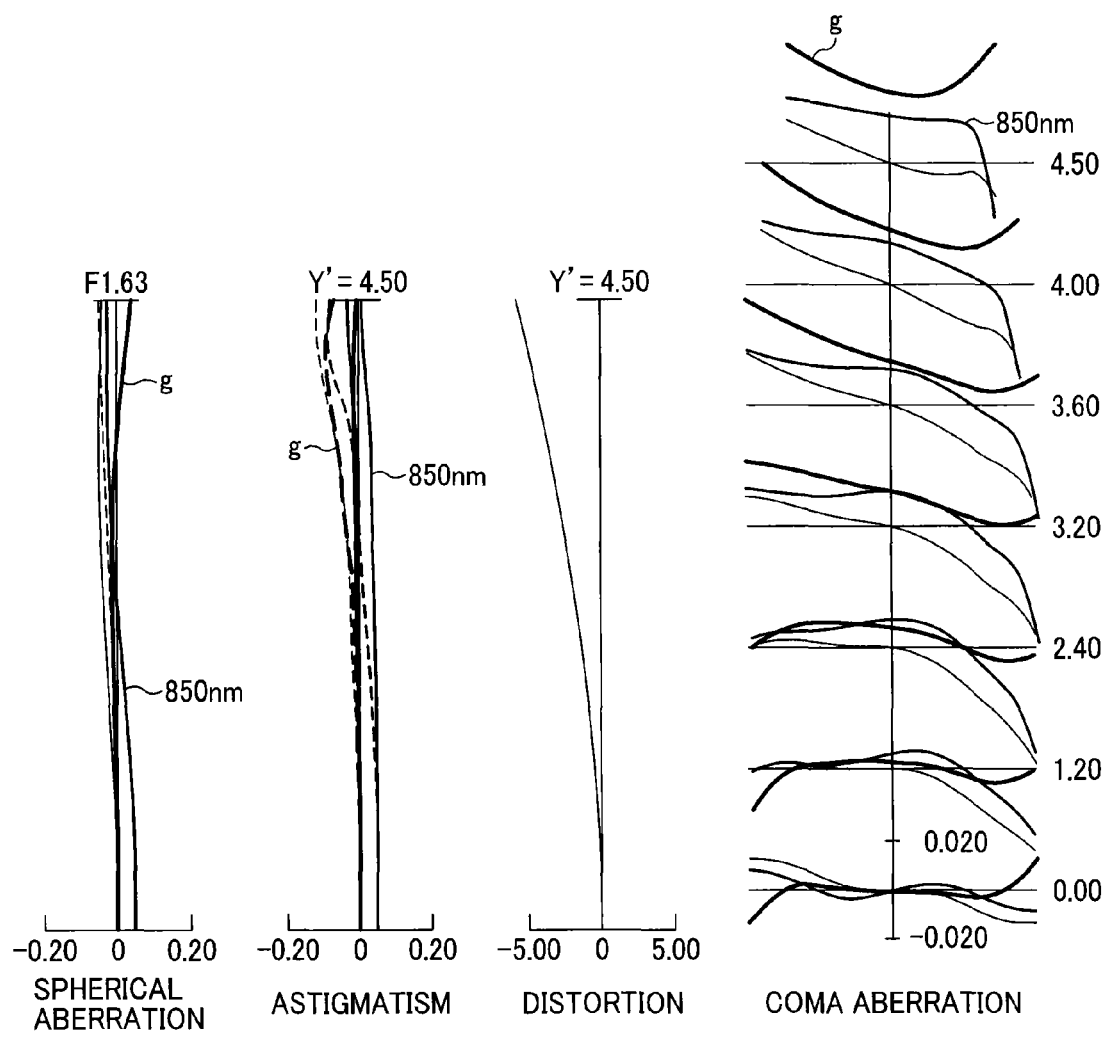
FIG. 14 is an aberration curve illustrating spherical aberration, astigmatism, distortion aberration, and coma aberration at the short focal end of the zoom lens according to Example 4 of the present invention illustrated in FIGS. 13A-13C.
Figure 15:
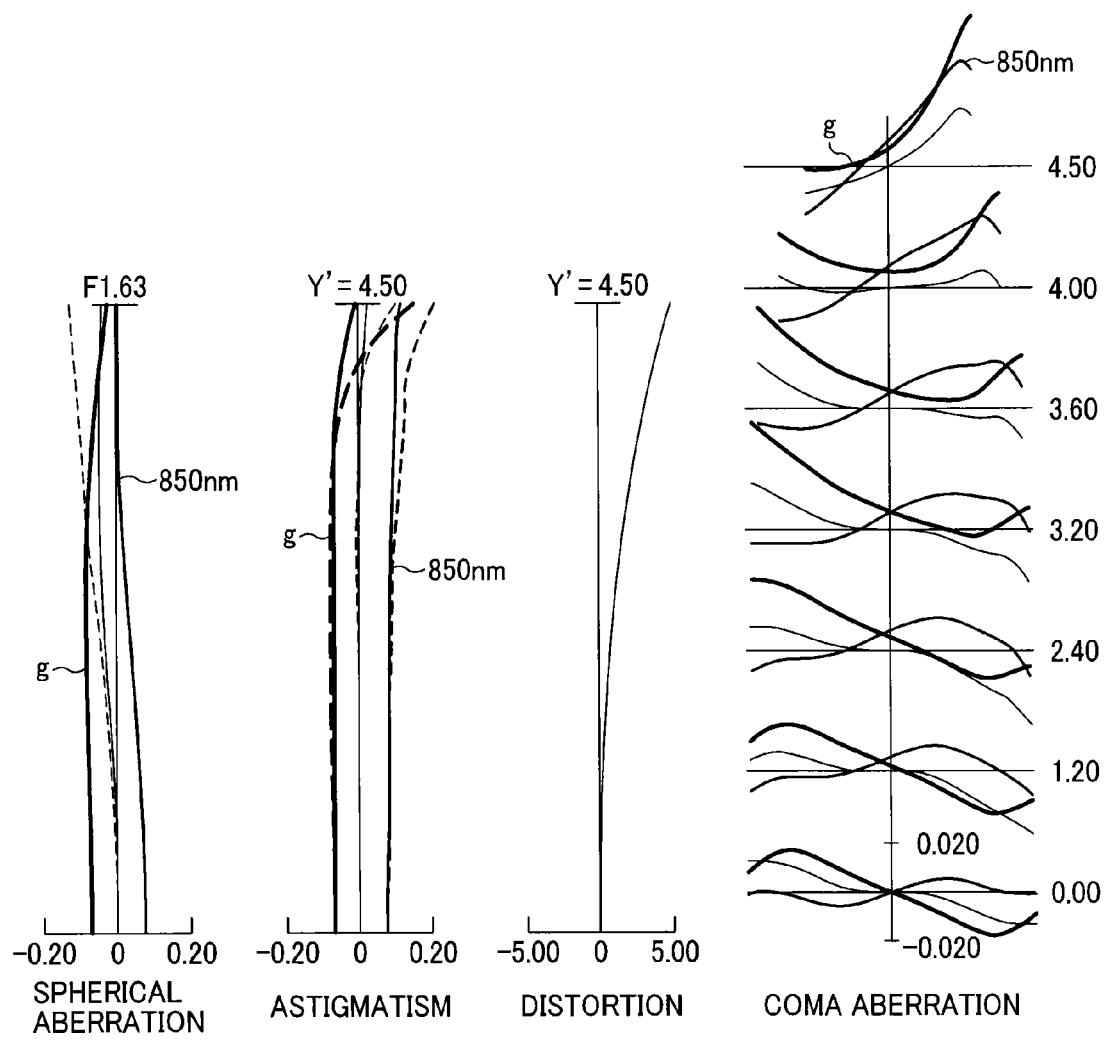
FIG. 15 is an aberration curve illustrating spherical aberration, astigmatism, distortion aberration, and coma aberration at the intermediate focal length of the zoom lens according to Example 4 of the present invention illustrated in FIGS. 13A-13C.
Figure 16:
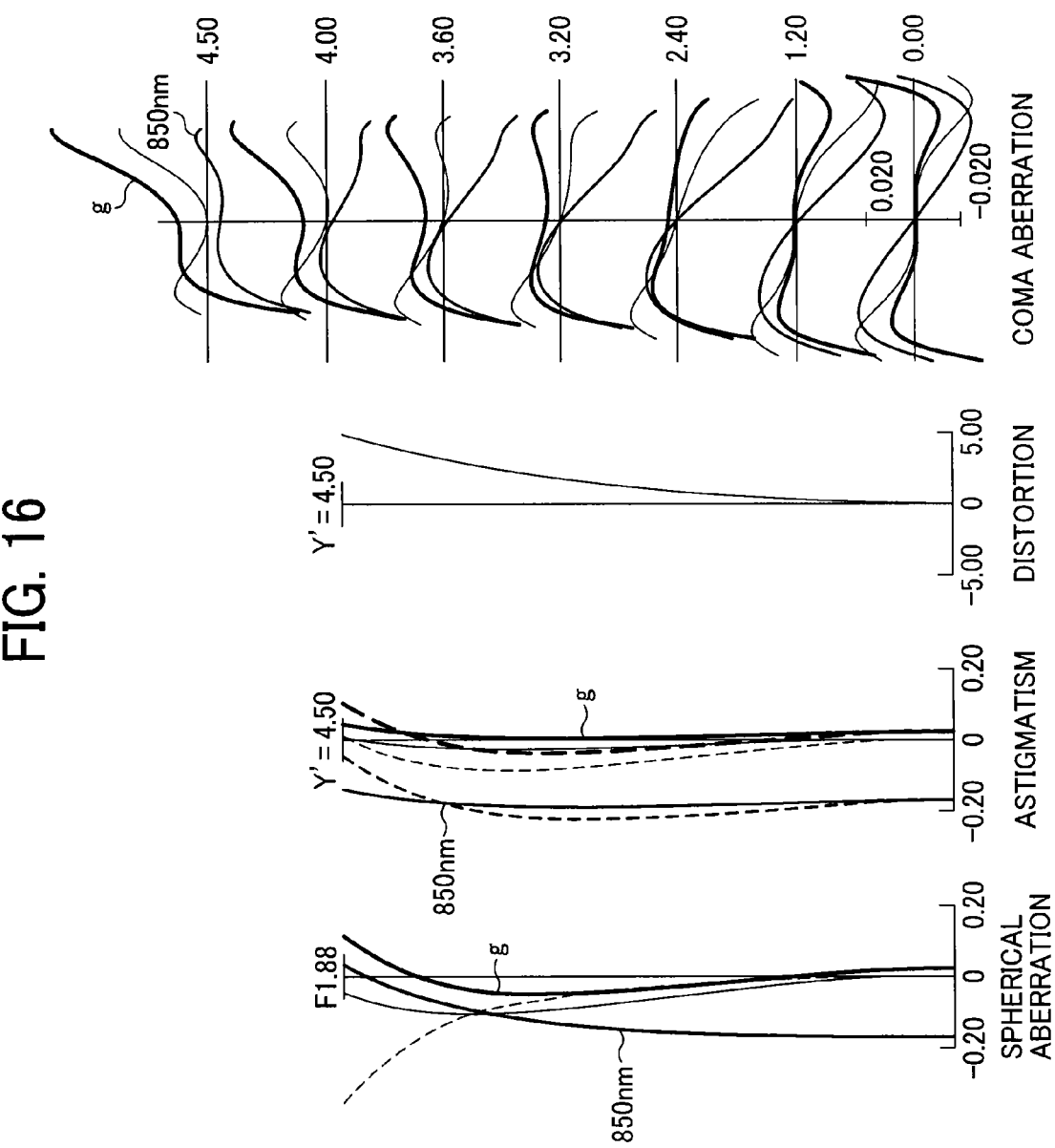
FIG. 16 is an aberration curve illustrating spherical aberration, astigmatism, distortion aberration, and coma aberration at the long focal end of the zoom lens according to Example 4 of the present invention illustrated in FIGS. 13A-13C.

In addition, FIGS. 14, 15, and 16 illustrate aberration curves of spherical aberration, astigmatism, distortion aberration, and coma aberration at the short focal end (wide angle end), the intermediate focal length, and the long focal end (telephoto end) of Example 4, respectively. In addition, in the aberration curves, a broken line of the spherical aberration curve indicates a sinusoidal condition; and a solid line and a broken line of the astigmatism graph indicate sagittal and meridional, respectively. These are the same in aberration curves of other examples.

As obvious from FIGS. 14 to 16, in the zoom lens according to Example 4, the aberrations are sufficiently corrected. Since the example may be adapted to a light receiving element of one million to five million pixels, it is obvious that, if the zoom lens is configured according to Example 4, it is possible to achieve a sufficiently small size and to secure significantly excellent imaging performance.

Fifth Embodiment

Figure 17:
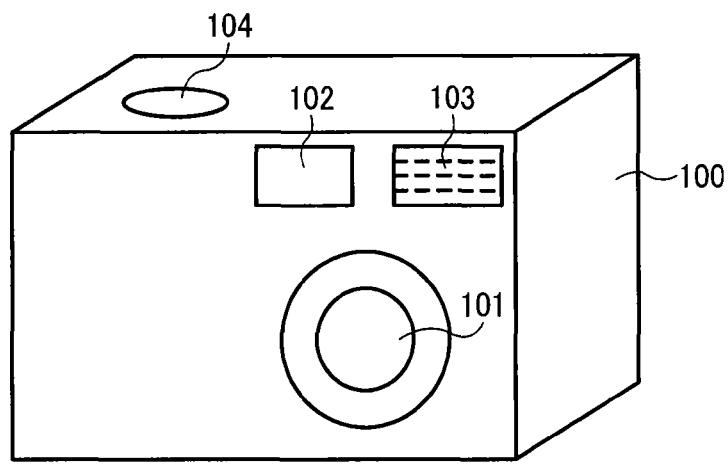
FIG. 17 is a schematic perspective view illustrating a configuration of outer appearance of a digital camera as a camera according to a fifth embodiment of the present invention as viewed from an object side (subject side)
Figure 18:
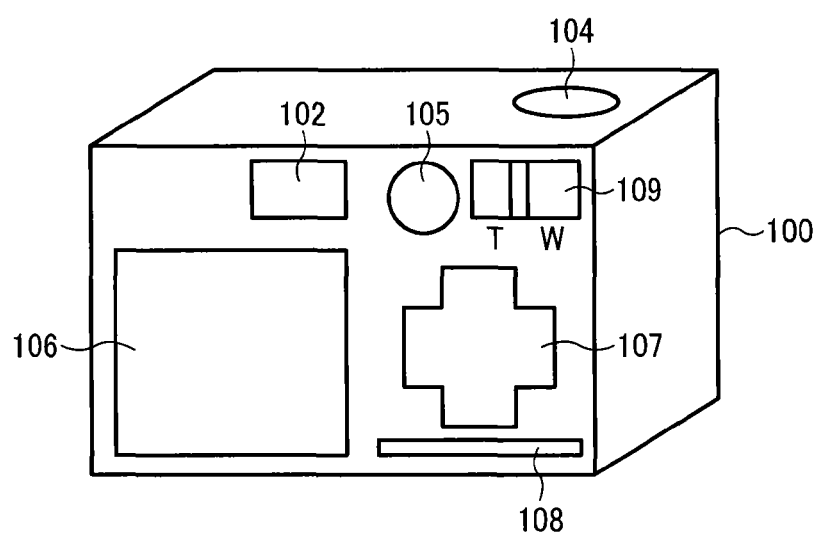
FIG. 18 is a schematic perspective view illustrating the configuration of outer appearance of the digital camera according to the fifth embodiment of the present invention of FIG. 17 as viewed from a photographer's side.
Figure 19:
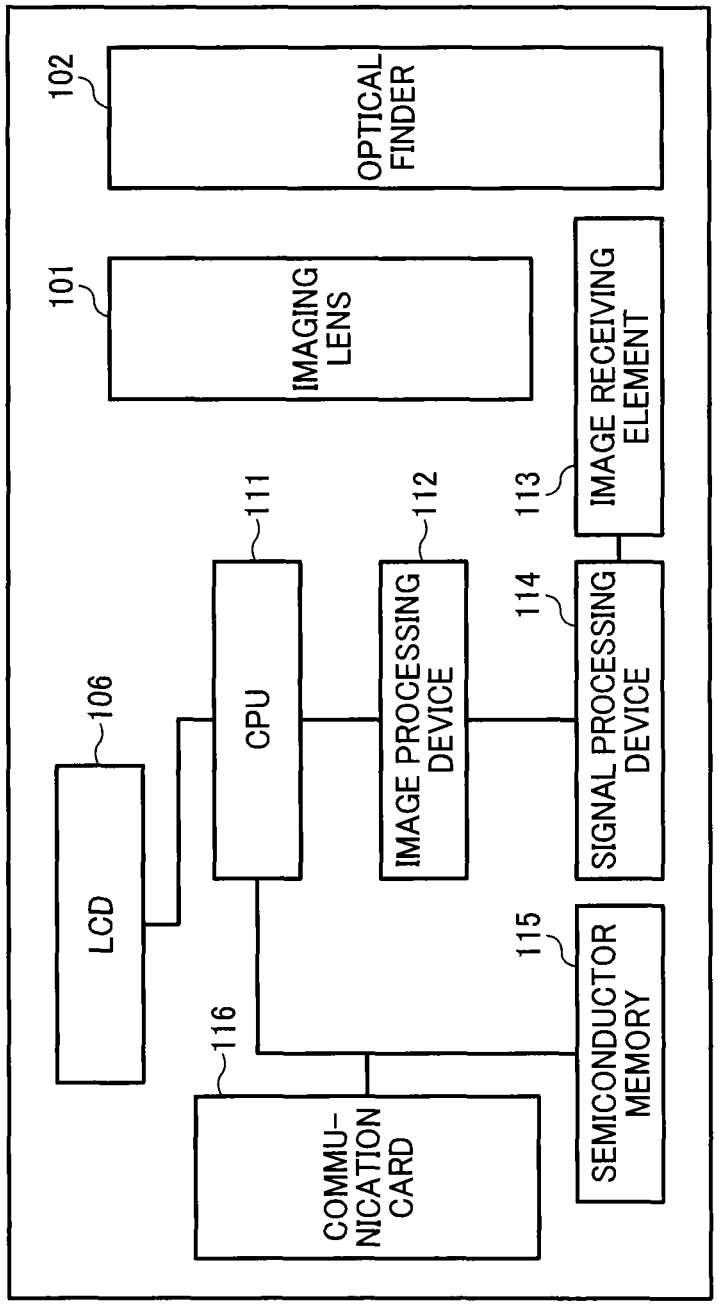
FIG. 19 is a block diagram illustrating a configuration of functions of the digital camera according to the fifth embodiment of the present invention of FIGS. 17 and 18.

Next, a camera according to a fifth embodiment of the present invention where a zoom lens such as the above-described zoom lenses of Examples 1 to 4 according to the first to fourth embodiments of the present invention is employed as a photographing optical system or a moving picture photographing optical system will be described with reference to FIGS. 17 to 19. FIG. 17 is a schematic perspective view illustrating a configuration of outer appearance of a digital camera as the camera according to the fifth embodiment of the present invention as viewed from an object side. FIG. 18 is a schematic perspective view illustrating a configuration of outer appearance of the digital camera as viewed from a photographer's side. In addition, FIG. 19 is a block diagram illustrating a configuration of functions of the digital camera. In addition, in FIGS. 17 to 19, although a digital camera is described as a camera, in addition to an imaging device mainly dedicated for imaging including a video camera for mainly photographing a moving picture and a so-called film camera of the related art using silver halide film, in many cases, various information devices including a portable communication device such as a mobile phone, a portable information terminal device referred as a personal data assistant (PDA) or the like, and further a portable terminal device such as a so-called smart phone and a tablet terminal including such a function are assembled with an imaging function corresponding to the digital camera or the like.

Such an information device also includes substantially the same function and configuration as the digital camera and the like while having a slightly different outer appearance, so that the above-described zoom lenses according to the first to fourth embodiments of the present invention may be used as an imaging optical system of the information device.

As illustrated in FIGS. 17 and 18, the digital camera is configured so that a camera body 100 is equipped with an imaging lens (photographing lens) 101, an optical finder 102, a strobe (electronic flash light) 103, a shutter button 104, a power switch 105, a liquid crystal display (LCD) monitor 106, an operation button 107, a memory card slot 108, a zoom switch 109, and the like. In addition, as illustrated in FIG. 19, the digital camera is configured so that a central processing unit (CPU) 111, an image processing device 112, a light receiving element 113, a signal processing device 114, a semiconductor memory 115, and a communication card or the like 116 are installed in the camera body 100.

The digital camera includes the imaging lens 101 as an imaging optical system and the light receiving element 113 which is configured as an image sensor by using a CMOS imaging element, a CCD imaging element, or the like to read an optical image of a subject focused by the imaging lens 101 by using the light receiving element 113. The zoom lenses according to the first to fourth embodiments of the present invention described in the above-described Examples 1 to 4 are used as the imaging lens 101.

An output of the light receiving element 113 is processed by the signal processing device 114 controlled by the CPU 111 to be converted into digital image information. After a predetermined image process is performed on the image information digitalized by the signal processing device 114 in the image processing device 112 which is also controlled by the CPU 111, the image information is recorded in the semiconductor memory 115 such as a nonvolatile memory. In this case, the semiconductor memory 115 may be a memory card which is inserted into the memory card slot 108 or a built-in semiconductor memory mounted on a board of the main body of the digital camera. An image in the middle of photographing may be displayed on the LCD monitor 106, or an image recorded in the semiconductor memory 115 may be displayed on the LCD monitor 106. In addition, the image recorded in the semiconductor memory 115 may be transmitted to an external unit through the communication card 116 inserted into a communication card slot (although it is not clearly illustrated, it may also be used as the memory card slot 108).

The imaging lens 101 is configured so that, during the time of carrying the camera, an object surface thereof is covered with a lens barrier (not clearly illustrated), and if a user turns on the camera by operating the power switch 105, the lens barrier is opened so as to expose the object surface. At this time, inside a barrel of the imaging lens 101, optical systems of lens groups constituting the zoom lens are arranged, for example, at the short focal end (wide angle end), and by operating the zoom switch 109, the arrangement of each lens group of the optical systems are changed, so that the operation of changing magnification through the intermediate focal length to the long focal end (telephoto end) may be performed.

In addition, it is preferable that an optical system of the optical finder 102 also perform changing magnification in conjunction with a change of an angle of view of the imaging lens 101.

In many cases, focusing is performed by half push operation of the shutter button 104.

The focusing of the zoom lenses according to the first to fourth embodiments of the present invention (the zoom lenses illustrated in Examples 1 to 4 described above) may be performed by movement of a portion of lens groups of the optical systems of plural lens groups constituting the zoom lens. If the shutter button 104 is further pushed into a full pushed state, photographing is performed, and after that, the above-described processes are performed.

In order to display the image recorded in the semiconductor memory 115 on the LCD monitor 106 or to transmit the image through the communication card or the like 116 to the external unit, the operation button 107 is operated in a predetermined manner. The semiconductor memory 115 and the communication card or the like 116 may be used in a state of being inserted into a dedicated or general-purpose slot such as the memory card slot 108 and the communication card slot.

In addition, when the imaging lens 101 is in a retracted state, each lens group of the focusing lens may not be necessarily arranged in parallel on the optical axis. For example, if the digital camera is configured with a mechanism where, at the retracting time, at least one of the second lens group G2 and the third lens group G3 is retracted from the optical axis and is accommodated in parallel with other lens groups, it is possible to implement a further thin configuration of the digital camera.

As described above, in the information device having the same imaging device or the same imaging function as the above-described digital camera (camera), the imaging lens 101 which is configured by using the zoom lenses of the first to fourth embodiments (Examples 1 to 4) may be used as a photographing optical system. Therefore, it is possible to implement an information device such as a portable information terminal device having the same imaging device or the same imaging function as a small-sized, high-image-quality digital camera using light receiving elements of one million to five million pixels or more.

In addition, the configurations of the zoom lenses according to the first to fourth embodiments of the present invention may also be applied to a photographing lens of a conventional silver halide film camera, a projection lens of a projector, or a zoom photographing lens used for a surveillance camera.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. A zoom lens comprising, in order from an object side:
a first lens group having a positive refractive power;
a second lens group having a negative refractive power;
a third lens group having a negative refractive power; and
a fourth lens group having a positive refractive power, wherein, during a change of magnification from a short focal end to a long focal end, the first lens group is fixed, the second lens group is moved to an image side, the third lens group is moved, and the fourth lens group is fixed, wherein the first lens group and the fourth lens group include diffraction surfaces and satisfy the following Condition Expressions (1) and (2), $$50 < f1doe/f1 < 200 \quad (1)$$

$$100 < f4doe/f4 < 300 \quad (2)$$

where f1doe denotes a focal length of the diffraction surface of the first lens group, f1 denotes a focal length of the first lens group, f4doe denotes a focal length of the diffraction surface of the fourth lens group, and f4 denotes a focal length of the fourth lens group.

2. The zoom lens according to claim 1, wherein the fourth lens group includes, from a position having the largest interval in the fourth lens group:

a 4a-th lens group arranged at the object side, including the diffraction surface; and a 4b-th lens group arranged at an image side.

3. The zoom lens according to claim 2, wherein only one positive lens among the positive lenses included in the 4a-th lens group satisfies the following Condition Expressions (3), (4), and (5), $$1.40 < n_d < 1.65 \quad (3)$$

$$65.0 < v_d < 100.0 \quad (4)$$

$$0.015 < P_{g,F} - (-0.001802 \times v_d + 0.6483) < 0.060 \quad (5)$$

where, $n_d$ denotes a refractive index of the positive lens, $v_d$ denotes an Abbe number of the positive lens, and $P_{g,F}$ denotes a partial dispersion ratio of the positive lens, and wherein $P_{g,F} = (n_g - n_F)/(n_F - n_C)$, where $n_g$, $n_F$, and $n_C$ denote refractive indexes of the positive lens with respect to a g line, an F line and a C line, respectively.

4. The zoom lens according to claim 3, wherein the positive lens satisfying said Condition Expressions (3), (4), and (5) satisfies the following Condition Expression (6), $$0.2 < f4p/ft < 0.6 \quad (6)$$

where f4p denotes a focal length of the positive lens satisfying said Condition Expressions (3), (4), and (5), and ft denotes a focal length at the long focal end.

5. The zoom lens according to claim 1, wherein only one positive lens among the positive lenses included in the first lens group satisfies the following Condition Expressions, $$1.40 < n_d < 1.65 \quad (3)$$

$$65.0 < v_d < 100.0 \quad (4)$$

$$0.015 < P_{g,F} - (-0.001802 \times v_d + 0.6483) < 0.060 \quad (5)$$

where, $n_d$ denotes a refractive index of the positive lens, $v_d$ denotes an Abbe number of the positive lens, and $P_{g,F}$ denotes a partial dispersion ratio of the positive lens, and wherein $P_{g,F} = (n_g - n_F)/(n_F - n_C)$, where $n_g$, $n_F$, and $n_C$ denote refractive indexes of the positive lens with respect to a g line, an F line and a C line, respectively.

6. The zoom lens according to claim 5, wherein the positive lens satisfying said Condition Expressions (3), (4), and (5) satisfies the following Condition Expression (7), $$1.0 < f1p/ft < 2.0 \quad (7)$$

where f1p denotes a focal length of the positive lens satisfying said Condition Expressions (3), (4), and (5), and ft denotes a focal length at the long focal end.

7. The zoom lens according to claim 1, satisfying the following Condition Expression (8), $$0.5 < f1/ft < 0.9 \quad (8)$$

where f1 denotes a focal length of the first lens group, and ft denotes a focal length at the long focal end.

8. The zoom lens according to claim 1, satisfying the following Condition Expression (9), $$0.1 < f4/ft < 0.3 \quad (9)$$

where f4 denotes a focal length of the fourth lens group, and ft denotes a focal length at the long focal end.

9. The zoom lens according to claim 1, wherein only one lens of the fourth lens group satisfies the following Condition Expressions (3), (4), and (5), $$1.40 < n_d < 1.65 \quad (3)$$

$$65.0 < v_d < 100.0 \quad (4)$$

$$0.015 < P_{g,F} - (-0.001802 \times v_d + 0.6483) < 0.060 \quad (5)$$

where, $n_d$ denotes a refractive index of the positive lens, $v_d$ denotes an Abbe number of the positive lens, and $P_{g,F}$ denotes a partial dispersion ratio of the positive lens, and wherein $P_{g,F} = (n_g - n_F)/(n_F - n_C)$, where $n_g$, $n_F$, and $n_C$ denote refractive indexes of the positive lens with respect to a g line, an F line and a C line, respectively.

10. The zoom lens according to claim 9, wherein the positive lens satisfying said Condition Expressions (3), (4), and (5) satisfies the following Condition Expression (6), $$0.2 < f4p/ft < 0.6 \quad (6)$$

where f4p denotes a focal length of the positive lens satisfying said Condition Expressions (3), (4), and (5), and ft denotes a focal length at the long focal end.

11. The zoom lens according to claim 2, wherein only one lens in the fourth lens group satisfies the following Condition Expressions, $$1.40 < n_d < 1.65 \quad (3)$$

$$65.0 < v_d < 100.0 \quad (4)$$

$$0.015 < P_{g,F} - (-0.001802 \times v_d + 0.6483) < 0.060 \quad (5)$$

where, $n_d$ denotes a refractive index of the positive lens, $v_d$ denotes an Abbe number of the positive lens, and $P_{g,F}$ denotes a partial dispersion ratio of the positive lens, and wherein $P_{g,F} = (n_g - n_F)/(n_F - n_C)$, where $n_g$, $n_F$, and $n_C$ denote refractive indexes of the positive lens with respect to a g line, an F line and a C line, respectively.

12. A camera comprising a photographing optical system having the zoom lens according to claim 1.

13. The camera of claim 12, wherein the photographic optical system takes a still image or a moving image.

* * * * *